US010329737B2

(12) United States Patent
Hita et al.

(10) Patent No.: US 10,329,737 B2
(45) Date of Patent: Jun. 25, 2019

(54) HYBRID CONSTRUCTION MACHINE

(71) Applicant: Hitachi Construction Machinery Co., Ltd., Taito-ku, Tokyo (JP)

(72) Inventors: Masafumi Hita, Tsuchiura (JP); Shinya Imura, Toride (JP); Shinji Nishikawa, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 36 days.

(21) Appl. No.: 15/552,829

(22) PCT Filed: Feb. 22, 2016

(86) PCT No.: PCT/JP2016/055003
§ 371 (c)(1),
(2) Date: Aug. 23, 2017

(87) PCT Pub. No.: WO2017/033474
PCT Pub. Date: Mar. 2, 2017

(65) Prior Publication Data
US 2018/0030690 A1    Feb. 1, 2018

(30) Foreign Application Priority Data
Aug. 25, 2015  (JP) .................. 2015-165842

(51) Int. Cl.
*B60K 6/46* (2007.10)
*E02F 9/20* (2006.01)
(Continued)

(52) U.S. Cl.
CPC .............. *E02F 9/2075* (2013.01); *B60K 6/46* (2013.01); *B60K 25/00* (2013.01); *B60K 25/02* (2013.01);
(Continued)

(58) Field of Classification Search
CPC ......... E02F 9/2075; E02F 9/2091; E02F 9/26; B60W 20/00; B60W 10/04; B60W 10/06;
(Continued)

(56) References Cited

U.S. PATENT DOCUMENTS

| 2005/0001606 A1 | 1/2005 | Kagoshima |
| 2010/0115938 A1* | 5/2010 | Kobata ................ E02F 9/2203 60/422 |

(Continued)

FOREIGN PATENT DOCUMENTS

| JP | 2001-3396 A | 1/2001 |
| JP | 3941951 B2 | 7/2007 |

(Continued)

OTHER PUBLICATIONS

International Search Report (PCT/ISA/220 & PCT/ISA/210) issued in PCT Application No. PCT/JP2016/055003 dated Mar. 22, 2016 with English translation (seven pages).

(Continued)

*Primary Examiner* — Aaron L Troost
*Assistant Examiner* — Paula L Schneider
(74) *Attorney, Agent, or Firm* — Crowell & Moring LLP

(57) ABSTRACT

An output command calculating section (40) of an HCU (36) restricts a battery discharge power from an electricity storage device (31) based upon a battery electricity storage rate (SOC) and a current square integrating rate (Risc) of the electricity storage device (31). Thereby, the HCU (36) transfers from a normal mode (NMODE) to a low speed mode (LSMODE) to lower a movement speed of a hydraulic actuator. A monitor display amount calculating section (50) of the HCU (36) calculates a maximum speed reduction rate (DRs) based upon a battery discharge power limit value (Plim0) and an engine output upper limit value (Pemax) from the output command calculating section (40). A moni- (Continued)

tor device (39) displays a reduction rate of the movement speed of the hydraulic actuator in the low speed mode (LSMODE) based on the maximum speed reduction rate (DRs).

3 Claims, 21 Drawing Sheets

(51) Int. Cl.
*E02F 9/26* (2006.01)
*B60K 25/00* (2006.01)
*B60K 25/02* (2006.01)
*B60W 10/04* (2006.01)
*B60W 10/06* (2006.01)
*B60W 10/08* (2006.01)
*B60W 10/30* (2006.01)
*B60W 20/00* (2016.01)
*B60W 50/14* (2012.01)

(52) U.S. Cl.
CPC ............ *B60W 10/04* (2013.01); *B60W 10/06* (2013.01); *B60W 10/08* (2013.01); *B60W 10/30* (2013.01); *B60W 20/00* (2013.01); *B60W 50/14* (2013.01); *E02F 9/2091* (2013.01); *E02F 9/26* (2013.01); *B60K 2025/005* (2013.01); *B60K 2025/026* (2013.01); *B60W 2050/146* (2013.01)

(58) Field of Classification Search
CPC ...... B60W 10/08; B60W 10/30; B60W 50/14; B60W 2050/146; B60K 6/46; B60K 25/00; B60K 25/02; B60K 2025/005; B60K 2025/026

USPC ......................................................... 701/50
See application file for complete search history.

(56) References Cited

U.S. PATENT DOCUMENTS

2013/0110348 A1    5/2013  Jinbo et al.
2013/0317684 A1*  11/2013  Kaneko ................ E02F 9/2075
                                                                 701/22
2014/0277877 A1*   9/2014  Sheidler .................. B60K 6/48
                                                                 701/22
2015/0005996 A1*   1/2015  Bergkoetter ........ B60L 11/1861
                                                                 701/22

FOREIGN PATENT DOCUMENTS

JP            5271300 B2      8/2013
JP          2015-94173 A      5/2015
WO     WO 2012/114782 A1      8/2012

OTHER PUBLICATIONS

Japanese-language Written Opinion (PCT/ISA/237) issued in PCT Application No. PCT/JP2016/055003 dated Mar. 22, 2016 (three pages).
Korean-language Office Action issued in counterpart Korean Application No. 10-2017-7023015 dated Nov. 1, 2018 with English translation (11 pages).

* cited by examiner

<STATUS OF ELECTRICITY STORAGE DEVICE>

| | SOC | CURRENT SQUARE INTEGRATING RATE | DISPLAY VALUE |
|---|---|---|---|
| PRESENT VALUE [%] | 60 | 0 | — |
| COMMON SCALE CONVERSION VALUE [%] | 100 | 100 | 100 |
| MAXIMUM SPEED REDUCTION RATE [%] | 100 | 100 | 100 |
| LOW SPEED MODE ARRIVAL PREDICTING TIME [min] | NOT REACHED | NOT REACHED | — |
| PREDICTING MAXIMUM SPEED REDUCTION RATE [%] | 100 | 100 | 100 |

<STATUS OF ELECTRICITY STORAGE DEVICE>

| | SOC | CURRENT SQUARE INTEGRATING RATE | DISPLAY VALUE |
|---|---|---|---|
| PRESENT VALUE [%] | 47.5 | 30 | — |
| COMMON SCALE CONVERSION VALUE [%] | 50 | 66.7 | 50 |
| MAXIMUM SPEED REDUCTION RATE [%] | 100 | 100 | 100 |
| LOW SPEED MODE ARRIVAL PREDICTING TIME [min] | 2 | 10 | 2 |
| PREDICTING MAXIMUM SPEED REDUCTION RATE [%] | 75 | 80 | 75 |

<STATUS OF ELECTRICITY STORAGE DEVICE>

| | SOC | CURRENT SQUARE INTEGRATING RATE | DISPLAY VALUE |
|---|---|---|---|
| PRESENT VALUE [%] | 55 | 30 | — |
| COMMON SCALE CONVERSION VALUE [%] | 80 | 66.7 | 66.7 |
| MAXIMUM SPEED REDUCTION RATE [%] | 100 | 100 | 100 |
| LOW SPEED MODE ARRIVAL PREDICTING TIME [min] | 10 | 3 | 3 |
| PREDICTING MAXIMUM SPEED REDUCTION RATE [%] | 90 | 80 | 80 |

<STATUS OF ELECTRICITY STORAGE DEVICE>

| | SOC | CURRENT SQUARE INTEGRATING RATE | DISPLAY VALUE |
|---|---|---|---|
| PRESENT VALUE [%] | 32.5 | 30 | — |
| COMMON SCALE CONVERSION VALUE [%] | 0 | 66.7 | 0 |
| MAXIMUM SPEED REDUCTION RATE [%] | 85 | 100 | 85 |
| LOW SPEED MODE ARRIVAL PREDICTING TIME [min] | 0 | NOT REACHED | 0 |
| PREDICTING MAXIMUM SPEED REDUCTION RATE [%] | 80 | 100 | 80 |

<STATUS OF ELECTRICITY STORAGE DEVICE>

| PRESENT VALUE[%] | SOC | CURRENT SQUARE INTEGRATING RATE | DISPLAY VALUE |
|---|---|---|---|
| PRESENT VALUE[%] | 55 | 96.7 | — |
| COMMON SCALE CONVERSION VALUE[%] | 80 | 0 | 0 |
| MAXIMUM SPEED REDUCTION RATE[%] | 100 | 80 | 80 |
| LOW SPEED MODE ARRIVAL PREDICTING TIME[min] | NOT REACHED | 0 | 0 |
| PREDICTING MAXIMUM SPEED REDUCTION RATE[%] | 100 | 80 | 80 |

HYBRID CONSTRUCTION MACHINE

TECHNICAL FIELD

The present invention relates to a hybrid construction machine on which an engine and a motor-generator are mounted.

BACKGROUND ART

In general, there is known a hybrid construction machine provided with a motor-generator that is jointed mechanically to an engine and a hydraulic pump, and an electricity storage device such as a lithium ion battery or a capacitor (for example, refer to Patent Document 1 and Patent Document 2). In this hybrid construction machine, the motor-generator plays a role of charging electric power generated by a driving force of the engine to the electricity storage device or assisting the engine by a powering operation using electric power of the electricity storage device. Many hybrid construction machines are provided with an electric motor separated from the motor-generator, and the electric motor acts for or assists in an operation of a hydraulic actuator. For example, at the time of performing a revolving movement by the electric motor, the electric motor performs or assists in the revolving movement of an upper revolving structure by electric power supply to the electric motor, and braking energy at a revolving stop is regenerated to perform a charge of the electricity storage device.

In this hydraulic construction machine, it is possible to enhance a reduction effect of a fuel consumption by increasing the output of the motor-generator or revolving electric motor. However, when the output of the motor-generator or the like is made large, there are some cases where sufficient electric power cannot be supplied due to the limitations of a discharge capability, a capacity, a temperature and the like of the electricity storage device. In this case, continuation of the electric power supply from the electricity storage device leads to hard use, accelerating degradation of the electricity storage device.

There is known the configuration made in consideration of the above problems. For example, Patent Document 1 discloses the configuration that a movement speed of a vehicle is lowered in response to a reduction of an electricity storage rate (SOC: state of charge) for preventing the degradation acceleration of the electricity storage device, preventing the hard use of the electricity storage device.

In addition, there are generally a plurality of parameters indicative of degradation of the electricity storage device, but it is difficult to simultaneously monitor the plurality of parameters. Therefore, Patent Document 2 discloses the configuration in which a plurality of parameters in regard to temperatures are mainly converted into given common scales a representative value of which is displayed on a monitor.

PRIOR ART DOCUMENTS

Patent Documents

Patent Document 1: Japanese Patent No. 3941951
Patent Document 2: Japanese Patent No. 5271300

SUMMARY OF THE INVENTION

In the hybrid construction machine described in Patent Document 1, the movement speed of the vehicle is lowered in response to the reduction of the electricity storage rate for preventing the hard use of the electricity storage device. At this time, it is necessary to make an announcement that the movement speed is in a reduced state to an operator. In a case of making no announcement, there is a possibility that the operator determines that the reduction in the movement speed is made due to a failure, and besides, there is a possibility that strange operation feelings occur in the operator. Accordingly, it is necessary to display a state of the electricity storage device on, for example, a monitor. However, as described in Patent Document 2, only performing the monitoring display of the state of the electricity storage device cannot make a relation between the electricity storage device and the movement speed apparent. Therefore, there is a possibility that the operator cannot fully understand whether or not the movement speed is lowered at this point. In addition thereto, at the continuation of the present work, there is a problem that the operator cannot fully understand a future movement state such as a reduction in speeds, either.

The present invention is made in view of the aforementioned problems in the conventional technology, and an object of the present invention is to provide a hybrid construction machine that enables an operator to easily understand a relation between a state of an electricity storage device and a low speed mode.

For solving the above problems, a hybrid construction machine according to the present invention comprises an engine; a motor-generator that is connected mechanically to the engine; an electricity storage device that is connected electrically to the motor-generator; a hydraulic pump that is driven by torque of the engine and/or the motor-generator; a plurality of hydraulic actuators that are driven by pressurized oil from the hydraulic pump; a controller that controls output of the electricity storage device; and a monitor device that is connected to the controller, characterized in that: the controller includes: an electricity storage device state detecting section that detects a plurality of state-amounts indicative of a state of the electricity storage device; a low speed mode executing section that, when any one of the plurality of state-amounts detected by the electricity storage device state detecting section surpasses a given threshold, executes a low speed mode for reducing a movement speed of the hydraulic actuator in accordance with the surpassing degree; and a speed reduction degree calculating section that calculates a speed reduction degree of a speed of the hydraulic actuator in the low speed mode; wherein the monitor device includes a speed reduction degree displaying part that displays the speed reduction degree of the speed of the hydraulic actuator.

According to the present invention, an operator can easily understand a relation between the state of the electricity storage device and the low speed mode by a visual contact with the monitor device.

MODE FOR CARRYING OUT THE INVENTION

Figure 1:
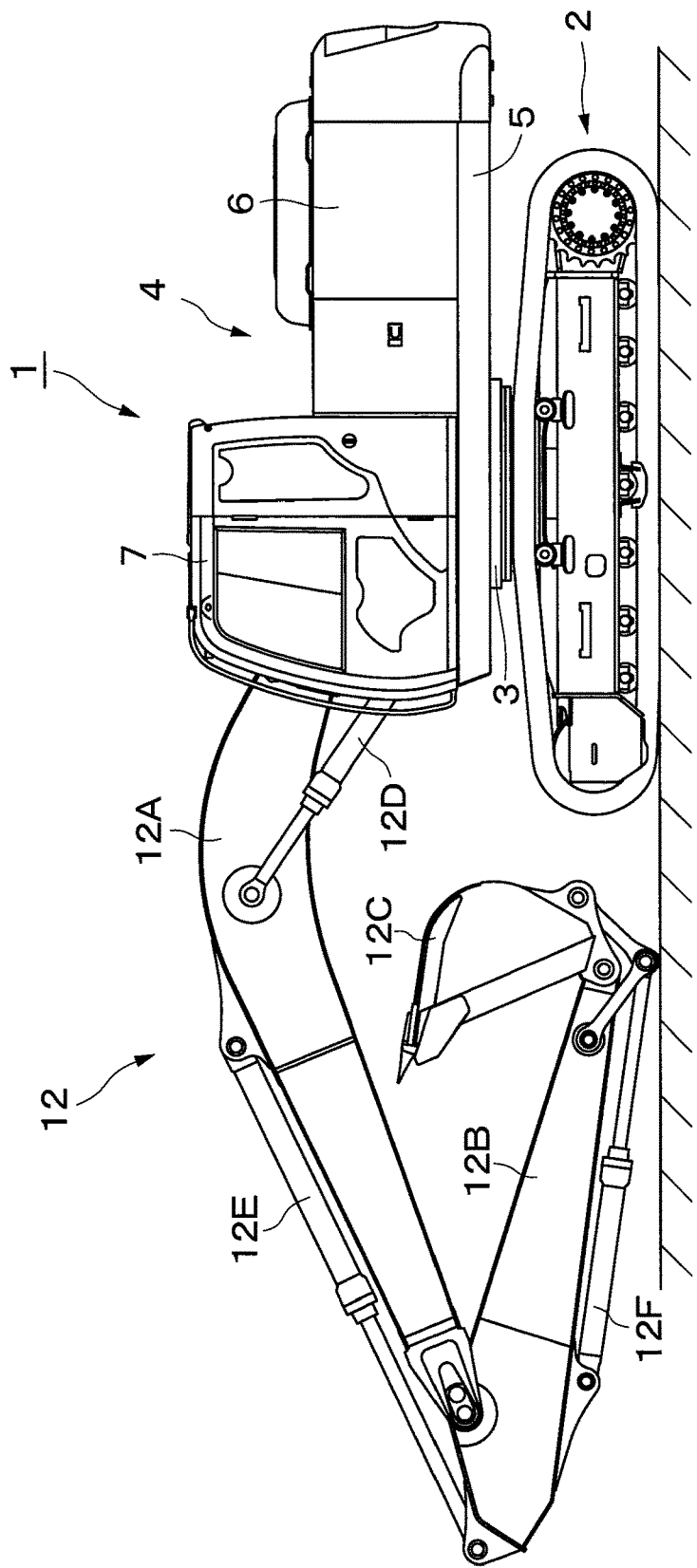
FIG. 1 is a front view showing a hybrid hydraulic excavator according to an embodiment of the present invention.

Hereinafter, a hybrid hydraulic excavator as an example of a hybrid construction machine according to an embodiment in the present invention will be explained with reference to the accompanying drawings.

FIG. 1 to FIG. 21 show an embodiment of the present invention. A hybrid hydraulic excavator 1 (hereinafter, referred to as "hydraulic excavator 1") is provided with an engine 21 and a motor-generator 27, which will be described later. The hydraulic excavator 1 includes an automotive lower traveling structure 2 of a crawler type, a revolving device 3 that is provided on the lower traveling structure 2, an upper revolving structure 4 that is mounted through the revolving device 3 on the lower traveling structure 2 to be capable of revolving thereon, and a working mechanism 12 of an articulated structure that is provided in the front side of the upper revolving structure 4 and performs an excavating operation of earth and sand, and the like. At this time, the lower traveling structure 2 and the upper revolving structure 4 configure a vehicle body of the hydraulic excavator 1.

Figure 14:
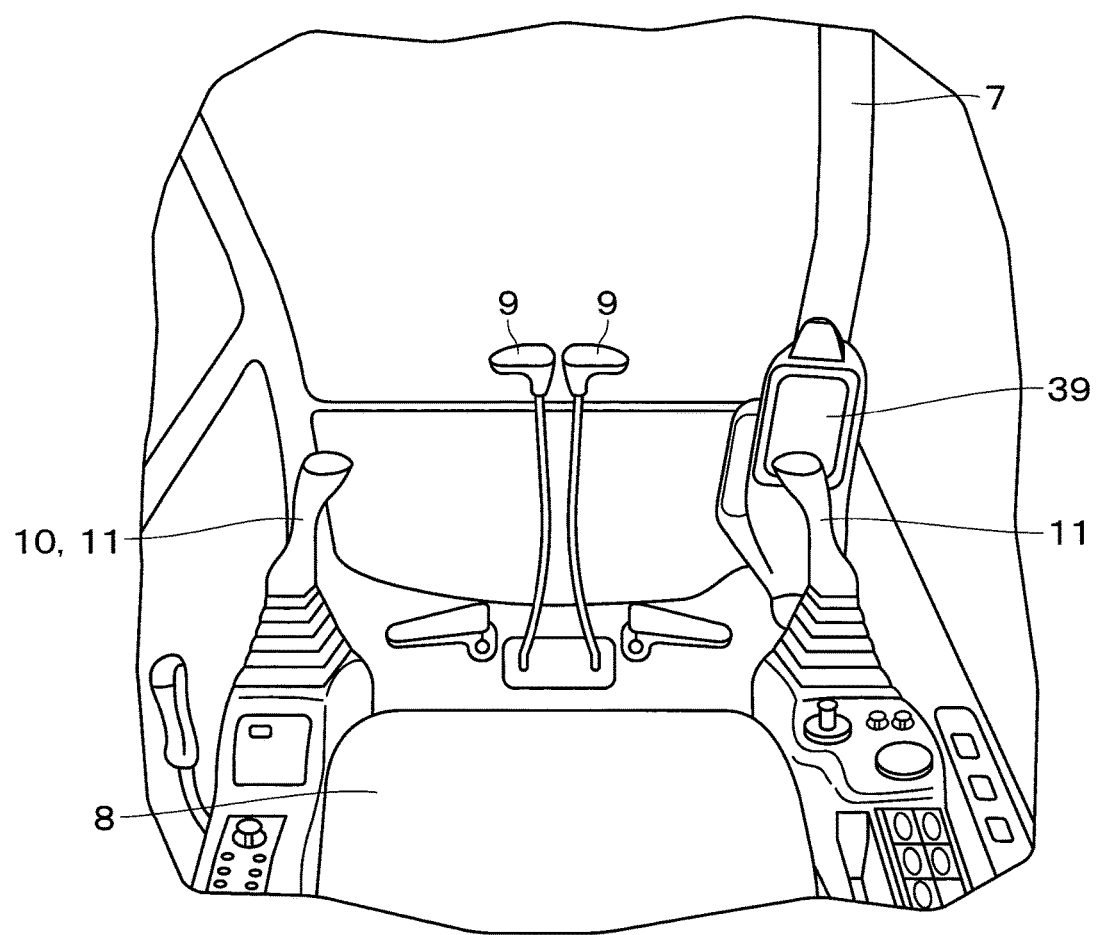
FIG. 14 is a perspective view showing an essential part showing the inside of a cab in FIG. 1.

The upper revolving structure 4 is provided with a housing cover 6 that is provided on a revolving frame 5 to accommodate therein the engine 21 and the like, and a cab 7 for an operator getting in. As shown in FIG. 14, an operator's seat 8 on which an operator sits is provided in the cab 7, and a traveling operation device 9 that is composed of operating levers, operating pedals and the like, a revolving operation device 10 that is composed of an operating lever and the like, and a working operation device 11 that is composed of operating levers and the like are provided in the periphery of the operator's seat 8.

The traveling operation device 9 is arranged, for example, in front of the operator's seat 8. The revolving operation device 10 corresponds to, for example, an operating section of the operating lever in a front-rear direction arranged in the left side to the operator's seat 8. In addition, the working operation device 11 corresponds to an operating (arm operating) section of the operating lever in a left-right direction arranged in the left side to the operator's seat 8, and an operating (boom operating) section of the operating lever in a front-rear direction and an operating (bucket operating) section of the operating lever in a left-right direction arranged in the right side to the operator's seat 8. It should be noted that a relation of an operating direction of the operating lever to a revolving movement or a working movement is not limited to the aforementioned relation, but may be optionally set in accordance with a specification of the hydraulic excavator 1 or the like.

Here, the operation devices 9 to 11 are respectively provided with operating amount sensors 9A to 11A that detect their operating amounts (lever operating amount OA). The operating amount sensors 9A to 11A configure a vehicle body operating-state detecting device that detects an operating state of the vehicle body, such as a traveling operation of the lower traveling structure 2, a revolving operation of the upper revolving structure 4 or a lifting/tilting operation (excavating operation) of the working mechanism 12. Further, an engine control dial 38 and a monitor device 39 which will be described later are provided in the cab 7.

As shown in FIG. 1, the working mechanism 12 is configured of, for example, a boom 12A, an arm 12B and a bucket 12C, and a boom cylinder 12D, an arm cylinder 12E and a bucket cylinder 12F for driving them. The boom 12A, the arm 12B and the bucket 12C are pinned to each other. The working mechanism 12 is attached to the revolving frame 5, and extends or contracts the cylinders 12D to 12F to perform a lifting/tilting movement.

Here, the hydraulic excavator 1 is provided thereon with an electric system that controls the motor-generator 27 and the like, and a hydraulic system that controls movements of the working mechanism 12 and the like. Further, the hydraulic excavator 1 is provided with the monitor device 39 that displays a state of an electricity storage device 31. Hereinafter, an explanation will be made of the system configuration in the hydraulic excavator 1 with reference to FIG. 2 to FIG. 16.

Figure 2:
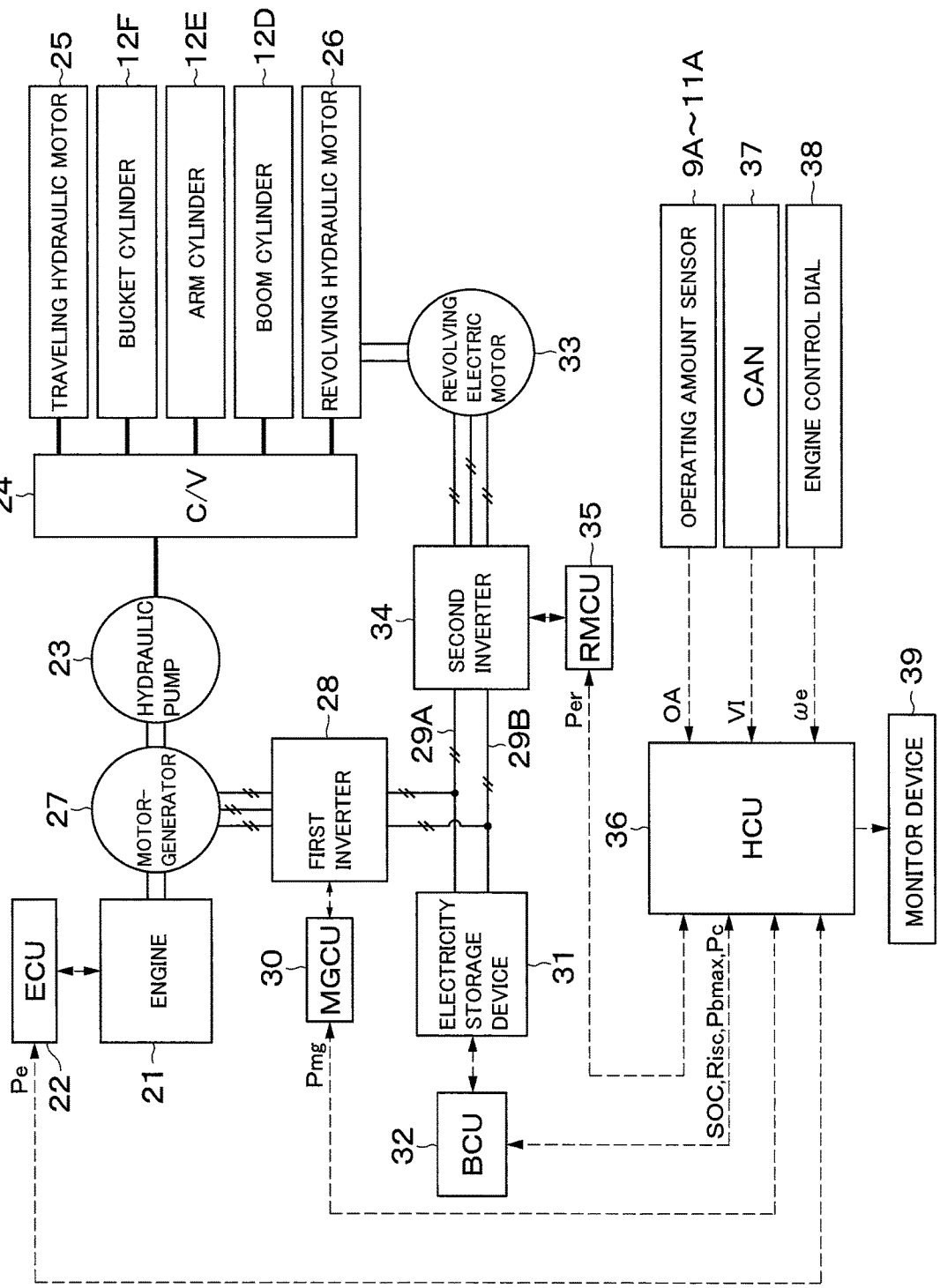
FIG. 2 is a block diagram showing a hydraulic system and an electric system that are applied to the hybrid hydraulic excavator in FIG. 1.

The engine 21 is mounted on the revolving frame 5. The engine 21 is configured of an internal combustion engine such as a diesel engine. As shown in FIG. 2, a hydraulic pump 23 and the motor-generator 27, which will be described later, are attached mechanically to the output side of the engine 21 for serial connection. The hydraulic pump 23 and the motor-generator 27 are driven by the engine 21. Here, an operation of the engine 21 is controlled by an engine control unit 22 (hereinafter, referred to as "ECU 22").

The ECU 22 controls output torque, a rotational speed (engine rotational number) and the like of the engine 21 based upon an engine output command Pe from an HCU 36. It should be noted that the maximum output of the engine 21 is made smaller than the maximum power of the hydraulic pump 23, for example.

The hydraulic pump 23 is connected mechanically to the engine 21. The hydraulic pump 23 can be driven by the torque of the engine 21 alone. In addition, the hydraulic pump 23 can be driven by compound torque (total torque) made by adding assist torque of the motor-generator 27 to the torque of the engine 21. The hydraulic pump 23 pressurizes operating oil reserved in a tank (not shown), which is delivered to a traveling hydraulic motor 25, a revolving hydraulic motor 26, the cylinders 12D to 12F of the working mechanism 12, and the like as pressurized oil.

The hydraulic pump 23 is connected through a control valve 24 to the traveling hydraulic motor 25, the revolving hydraulic motor 26, and the cylinders 12D to 12F as hydraulic actuators. The hydraulic motors 25, 26 and the cylinders 12D to 12F are driven by the pressurized oil from the hydraulic pump. The control valve 24 supplies or discharges the pressurized oil delivered from the hydraulic pump 23 to or from the traveling hydraulic motor 25, the revolving hydraulic motor 26, and the cylinders 12D to 12F in response to operations to the traveling operation device 9, the revolving operation device 10 and the working operation device 11.

Specifically, the pressurized oil is supplied to the traveling hydraulic motor 25 from the hydraulic pump 23 in response to an operation of the traveling operation device 9. As a result, the traveling hydraulic motor 25 drives/travels the lower traveling structure 2. The pressurized oil is supplied to the revolving hydraulic motor 26 from the hydraulic pump 23 in response to an operation of the revolving operation device 10. As a result, the revolving hydraulic motor 26 performs a revolving movement of the upper revolving structure 4. The pressurized oil is supplied to the cylinders 12D to 12F from the hydraulic pump 23 in response to an operation of the working operation device 11. As a result, the cylinders 12D to 12F lift/tilt the working mechanism 12.

The motor-generator 27 is connected mechanically to the engine 21. The motor-generator 27 is configured of, for example, a synchronous electric motor and the like. The motor-generator 27 plays two roles of power generation of performing power supply to the electricity storage device 31 and the revolving electric motor 33 by acting as an electric generator using the engine 21 as a power source, and a powering operation of assisting in driving the engine 21 and the hydraulic pump 23 by acting as a motor using electric power from the electricity storage device 31 and the revolving electric motor 33 as a power source. Accordingly, the assist torque of the motor-generator 27 is added to the torque of the engine 21 in response to the state, and the hydraulic pump 23 is driven by the engine torque and the assist torque. The movement of the working mechanism 12, a travel of the vehicle and the like are performed by the pressurized oil delivered from the hydraulic pump 23.

As shown in FIG. 2, the motor-generator 27 is connected to a pair of DC buses 29A, 29B through a first inverter 28. The first inverter 28 is configured using a plurality of switching elements such as a transistor and an insulating gate bipolar transistor (IGBT), and ON/OFF of each of the switching elements is controlled by a motor-generator control unit 30 (hereinafter, referred to as "MGCU 30"). The DC buses 29A, 29B are paired at a positive terminal side and at a negative terminal side, and, for example, a DC voltage of approximately several hundred V is applied thereto.

At the power generation of the motor-generator 27, the first inverter 28 converts AC power from the motor-generator 27 into DC power, which is supplied to the electricity storage device 31 or the revolving electric motor 33. At the powering operation of the motor-generator 27, the first inverter 28 converts the DC power of the DC buses 29A, 29B into AC power, which is supplied to the motor-generator 27. The MGCU 30 controls ON/OFF of each of the switching elements in the first inverter 28 based upon a motor-generator powering operation output command Pmg from the HCU 36 and the like. Thereby, the MGCU 30 controls generator power at the power generation of the motor-generator 27 and driving electric power at the powering operation of the motor-generator 27.

The electricity storage device 31 is connected electrically to the motor-generator 27. The electricity storage device 31 is configured of a plurality of cells (not shown) composed of, for example, lithium ion batteries and is connected to the DC buses 29A, 29B.

The electricity storage device 31 is charged with power supplied from the motor-generator 27 at the power generation of the motor-generator 27 and supplies driving electric power toward the motor-generator 27 at the powering operation (at the assist drive) of the motor-generator 27. In addition, the electricity storage device 31 is charged with regeneration power supplied from the revolving electric motor 33 at the regeneration of the revolving electric motor 33 and supplies driving electric power toward the revolving electric motor 33 at the powering operation of the revolving electric motor 33. In this way, the electricity storage device 31 stores therein the power generated by the motor-generator 27, and further, absorbs the regeneration power generated by the revolving electric motor 33 at the revolving braking of the hydraulic excavator 1 to hold the voltage of the DC buses 29A, 29B to be constant.

A charge operation or a discharge operation of the electricity storage device 31 is controlled by a battery control unit 32 (hereinafter, referred to as "BCU 32"). The BCU 32 configures an electricity storage device state detecting section. The BCU 32 detects, for example, a battery electricity storage rate SOC and a current square integrating rate Risc as a plurality of state-amounts of the electricity storage device 31. Further, the BCU 32 detects charge power to the electricity storage device 31 as a battery power value Pc, and calculates a battery allowance discharge power Pbmax based upon, for example, a cell voltage or a hardware current upper limit value. The battery allowance discharge power Pbmax indicates power that can be discharged by the present electricity storage device 31. The BCU 32 outputs the battery allowance discharge power Pbmax, the battery power value Pc, the battery electricity storage rate SOC, the current square integrating rate Risc and the like to the HCU 36.

In addition, the BCU 32 controls the charge/discharge of the electricity storage device 31 such that the revolving electric motor 33 and the motor-generator 27 are driven in response to an electric/revolving output command Per and the motor-generator powering operation output command Pmg from the HCU 36. At this time, the battery electricity storage rate SOC becomes a value corresponding to the electricity storage amount of the electricity storage device 31.

It should be noted that in the present embodiment, a lithium ion battery, for example, having a voltage of 350 V, a discharge capacity of 5 Ah, an appropriate use range of the battery electricity storage rate SOC (electricity storage rate) set to, for example, 30% to 70% and an appropriate use cell temperature set to 60° C. or less is used in the electricity storage device 31. The appropriate use range of the battery electricity storage rate SOC and the like are not limited to the above values, but are optionally set in accordance with a specification of the electricity storage device 31 or the like.

Here, the maximum output of the engine 21 is smaller than the maximum pump absorption power. In this case, as compared to when the engine 21 has a sufficiently large output to the maximum pump absorption power, a rate of contribution of engine assist by a powering operation of the motor-generator 27 at the vehicle body movement is larger. Therefore, the electricity storage device 31 severely repeats charge and discharge.

When the electricity storage device 31 generally performs excessive charge or discharge, the degradation is accelerated to lower the output. A degradation speed of the electricity storage device 31 differs depending upon the battery electricity storage rate SOC at the charging or discharging, or intensity of the charge or discharge itself. For example, in the electricity storage device 31 such as a lithium ion battery, an appropriate use range is defined to the electricity storage rate or the cell temperature by a manufacturer (for example, 30% to 70% in the electricity storage rate and 60° C. or less in the cell temperature). When the electricity storage device 31 is used over this range, the degradation speed greatly increases.

Likewise an appropriate use range of the electricity storage device 31 is in advance defined to the intensity of the charge or discharge as well. A current square integrating value is generally used as an index of the intensity of the charge or discharge. This is an index indicative of how much input or output of current is performed for a past constant time T traced back from the present time by integrating the square of the current for T time. At this time, in many cases the time T is set by plural times. This index is optionally set in accordance with a specification of the electricity storage device 31 or the like. Accordingly, when the electricity storage device 31 is used over an upper limit value of the current square integrating value, the degradation of the electricity storage device 31 is accelerated. Therefore, the electricity storage device 31 is used not to surpass the upper limit value of the current square integrating value as much as possible.

Hereinafter, a case where the time T is set to 100 seconds will be explained as one example. That is, the upper limit value of the current square integrating value for 100 seconds in the past is in advance determined. Therefore, by defining a rate of the present value and the upper limit value of the current square integrating value as the current square integrating rate Risc, the use of the electricity storage device 31 is controlled such that the current square integrating rate Risc does not surpass 100%. Accordingly, the appropriate use range of the current square integrating rate Risc is 0 to 100%. At this time, the BCU 32 is provided with, for example, a current sensor (not shown) that detects a current of the charge or discharge of the electricity storage device 31, and calculates the current square integrating rate Risc based upon the detected current. The current square integrating rate Risc is not limited to the calculation by the BCU 32, but, for example, the current of the electricity storage device 31 at the charging and the discharging may be detected from the BCU 32 and the current square integrating rate Risc may be calculated based upon the detected value of this current by the HCU 36. Likewise, the battery power value Pc may be also calculated based upon the detected value of the current of the electricity storage device 31 by the HCU 36.

The revolving electric motor 33 is driven by the power from the motor-generator 27 or the electricity storage device 31. The revolving electric motor 33 is configured of, for example, a three-phase induction motor, and is provided on the revolving frame 5 together with the revolving hydraulic motor 26. The revolving electric motor 33 drives the revolving device 3 in cooperation with the revolving hydraulic motor 26. Therefore, the revolving device 3 is driven by compound torque of the revolving hydraulic motor 26 and the revolving electric motor 33 to drive and revolve the upper revolving structure 4.

As shown in FIG. 2, the revolving electric motor 33 is connected to the DC buses 29A, 29B through a second inverter 34. The revolving electric motor 33 plays two roles of a powering operation of being driven/rotated by receiving the power from the electricity storage device 31 or the motor-generator 27, and regeneration of storing electricity in the electricity storage device 31 by generating power with extra torque at the revolving braking. Therefore, the power from the motor-generator 27 or the like is supplied through the DC buses 29A, 29B to the revolving electric motor 33 at the powering operation. Thereby, the revolving electric motor 33 generates rotational torque in response to an operation of the revolving operation device 10 to assist in a drive of the revolving hydraulic motor 26, and drive the revolving device 3 to perform a revolving movement of the upper revolving structure 4.

The second inverter 34 is, as similar to the first inverter 28, configured using a plurality of switching elements. ON/OFF of each of the switching elements in the second inverter 34 is controlled by a revolving electric motor control unit 35 (hereinafter, referred to as "RMCU 35"). At the powering operation of the revolving electric motor 33, the second inverter 34 converts the DC power of the DC buses 29A, 29B into AC power to be supplied to the revolving electric motor 33. At the regeneration of the revolving electric motor 33, the second inverter 34 converts the AC power from the revolving electric motor 33 into DC power to be supplied to the electricity storage device 31 and the like.

The RMCU 35 controls ON/OFF of each of the switching elements in the second inverter 34 based upon the electric/revolving output command Per from the HCU 36 and the like. Thereby, the RMCU 35 controls regeneration power at the regeneration of the revolving electric motor 33 and driving electric power at the powering operation thereof.

The hybrid control unit 36 (hereinafter, referred to as "HCU 36") configures a controller together with the BCU 32 to control the output of the electricity storage device 31. The HCU 36 is configured of, for example, a microcomputer, and is connected electrically to the ECU 22, the MGCU 30, the RMCU 35 and the BCU 32 using a CAN 37 (Controller Area Network) and the like. The HCU 36 exchanges communications with the ECU 22, the MGCU 30, the RMCU 35 and the BCU 32, while controlling the engine 21, the motor-generator 27, the revolving electric motor 33 and the electricity storage device 31.

The battery allowance discharge power Pbmax, the battery power value Pc, the battery electricity storage rate SOC, the current square integrating rate Risc, other vehicle body information V1, pump loads, mode information and the like are input through the CAN 37 and the like to the HCU 36. The operating amount sensors 9A to 11A that detect the lever operating amount OA of the operation devices 9 to 11 are connected to the HCU 36. As a result, the lever operating amount OA is input to the HCU 36. Further, the engine control dial 38 is connected to the HCU 36, and an engine target rotational speed ωe set by the engine control dial 38 is input to the HCU 36.

The HCU 36 has a normal mode NMODE and a low speed mode LSMODE. The HCU 36 selects and executes any one of the normal mode NMODE and the low speed mode LSMODE. Here, in the low speed mode LSMODE, for example, when the output beyond the actual output of the engine 21 is needed, a movement speed of each of the revolving device 3 and the working mechanism 12 is reduced. On the other hand, in the normal mode NMODE, a reduction in the movement speed by the low speed mode LSMODE is released.

The engine control dial 38 is configured of a rotatable dial, and sets the target rotational speed ωe of the engine 21 in accordance with a rotational position of the dial. The engine control dial 38 is positioned in the cab 7 and is operable to be rotated by an operator, outputting a command signal in accordance with the target rotational speed ωe.

Figure 15:
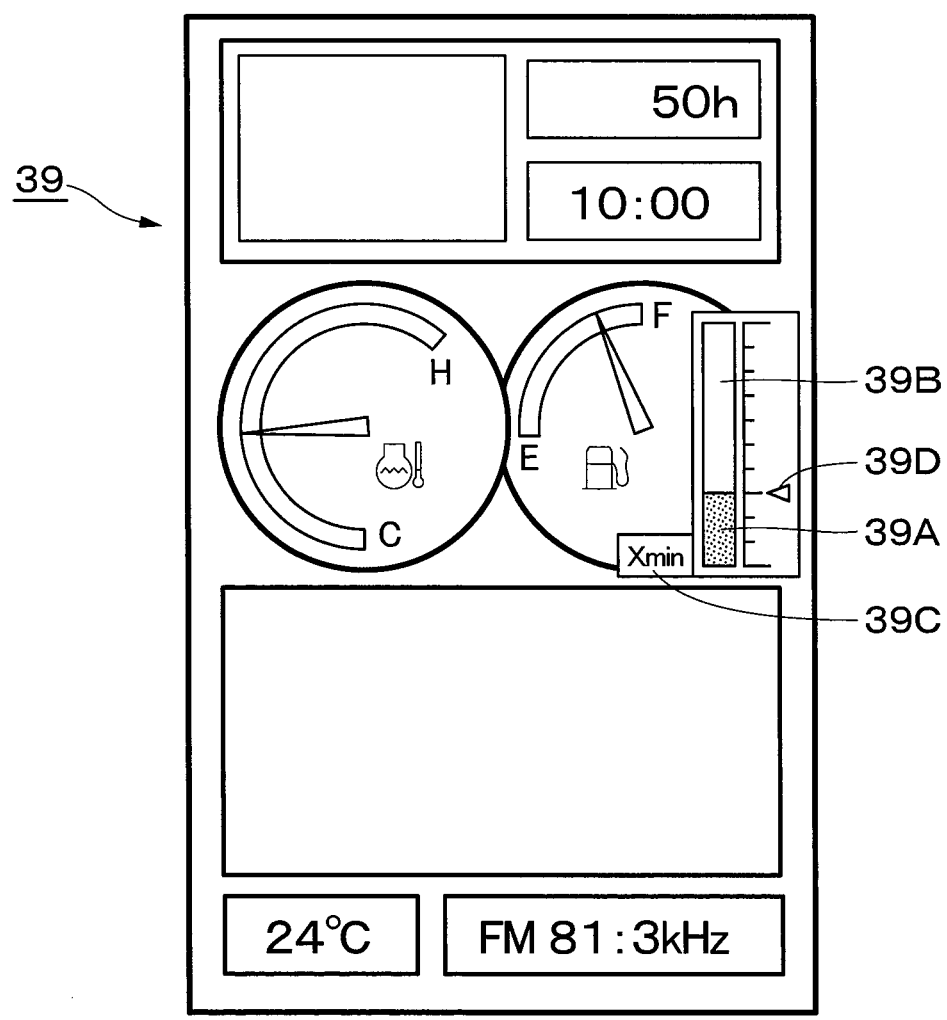
FIG. 15 is an explanatory diagram showing an example of a display screen displayed on the monitor device.

The monitor device 39 is connected to the HCU 36, and displays various pieces of information in regard to the vehicle body. As shown in FIG. 14 and FIG. 15, the monitor device 39 is arranged in the cab 7, and displays, for example, a remaining amount of fuel, a water temperature of engine cooling water, a working time and an in-vehicular compartment temperature. In addition thereto, the monitor device 39 includes a speed reduction degree displaying part 39A, a common scale displaying part 39B, a low speed mode arrival time displaying part 39C and a speed reduction degree predicting value displaying part 39D.

Figure 16:
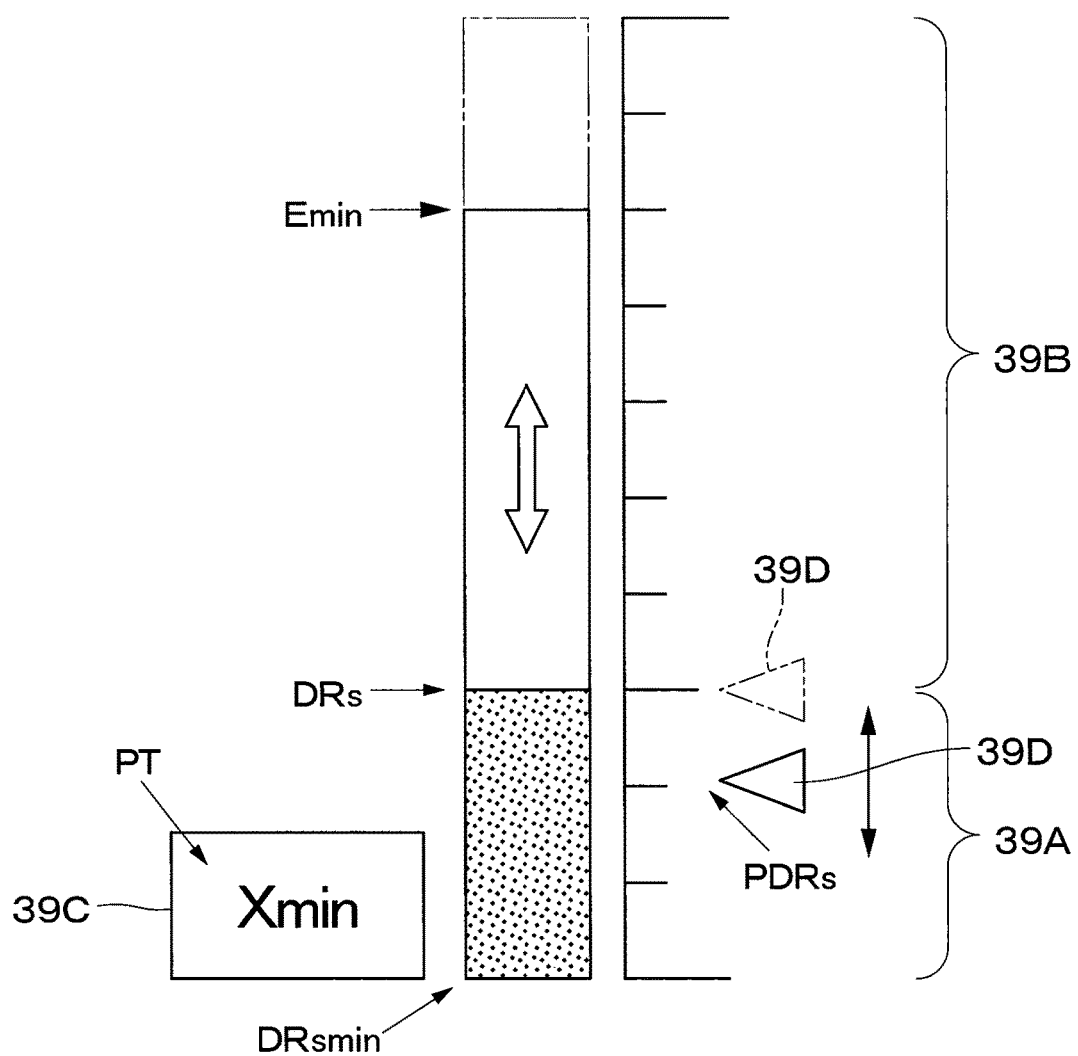
FIG. 16 is an explanatory diagram showing a speed reduction degree displaying part, a common scale displaying part, a low speed mode arrival time displaying part, and a speed reduction degree predicting value displaying part in the monitor device.

As shown in FIG. 15 and FIG. 16, the speed reduction degree displaying part 39A displays a maximum speed reduction rate DRs as a speed reduction degree of the speed of the hydraulic actuator (the hydraulic motors 25, 26 and cylinders 12D to 12F) in the low speed mode LSMODE. The speed reduction degree displaying part 39A is configured of, for example, a bar that expands/contracts in a longitudinal direction, a minimum value of the maximum speed reduction rate DRs is positioned in a lower end thereof, and a maximum value of the maximum speed reduction rate DRs is positioned in an upper end thereof. A maximum value section of the speed reduction degree displaying part 39A is continuous to a minimum value section of the common scale displaying part 39B. At this time, the maximum value of the maximum speed reduction rate DRs is 100%, for example, and the minimum value of the maximum speed reduction rate DRs is a maximum speed reduction rate minimum value DRsmin (for example, 70%).

When the HCU 36 is executing the normal mode NMODE, the maximum speed reduction rate DRs is the maximum value. Therefore, the bar of the speed reduction degree displaying part 39A becomes in the most extended state. On the other hand, when the HCU 36 is executing the low speed mode LSMODE, the maximum speed reduction rate DRs is a value between the maximum value and the minimum value. Therefore, the bar of the speed reduction degree displaying part 39A is contracted from the maximum extension and has a length dimension in accordance with the maximum speed reduction rate DRs.

The common scale displaying part 39B displays a common scale conversion minimum value Emin. When the respective present values of a plurality of state-amounts (battery electricity storage rate SOC, current square integrating rate Risc) of the electricity storage device 31 are converted into common scale values, the common scale conversion minimum value Emin indicates a representative value composed of anyone thereof. Specifically, the common scale conversion minimum value Emin indicates a minimum value of a first conversion value Eb made by converting the battery electricity storage rate SOC into the common scale and a second conversion value Er made by converting the current square integrating rate Risc into the common scale.

The common scale displaying part 39B is configured of, for example, a bar that expands/contracts in a longitudinal direction. The bar of the common scale displaying part 39B, for distinction from the speed reduction degree displaying part 39A, is displayed in a different color, for example. In the common scale displaying part 39B, the minimum value of the common scale conversion minimum value Emin is positioned in a lower end thereof, and the maximum value of the common scale conversion minimum value Emin is positioned in an upper end thereof.

At this time, the common scale conversion minimum value Emin is a value in accordance with allowance on transfer from the normal mode NMODE to the low speed mode LSMODE. Therefore, the common scale displaying part 39B informs that the transfer to the low speed mode LSMODE comes nearby contraction of the bar in accordance with the common scale conversion minimum value Emin. In addition, a minimum value section of the common scale displaying part 39B is continuous to a maximum value section of the speed reduction degree displaying part 39A. Therefore, when the common scale conversion minimum value Emin is lowered to transfer to the low speed mode LSMODE, the bar of the common scale displaying part 39B is contracted to be switched continuously to expansion/contraction of the bar of the speed reduction degree displaying part 39A. Therefore, an operator can continuously understand an allowance section in the normal mode NMODE and the speed reduction degree of the speed in the low speed mode LSMODE.

The low speed mode arrival time displaying part 39C displays a low speed mode arrival predicting time PT until arriving in the low speed mode LSMODE. The low speed mode arrival time displaying part 39C is positioned in the vicinity to the speed reduction degree displaying part 39A and the common scale displaying part 39B to display a numerical value of the low speed mode arrival predicting time PT in a given section (for example, in a minute section or in a second section).

The speed reduction degree predicting value displaying part 39D displays a predicting maximum speed reduction rate PDRs as a predicting value of a speed reduction degree of a speed of each of the hydraulic actuators (the hydraulic motors 25, 26 and the cylinders 12D to 12F) at the transferring to the low speed mode LSMODE. The speed reduction degree predicting value displaying part 39D is configured of an indicator disposed in the vicinity to the speed reduction degree displaying part 39A. The indicator of the speed reduction degree predicting value displaying part 39D indicates a length position (height position) of the bar of the speed reduction degree displaying part 39A where the arrival is predicted when the present movement continues to be performed.

Figure 3:
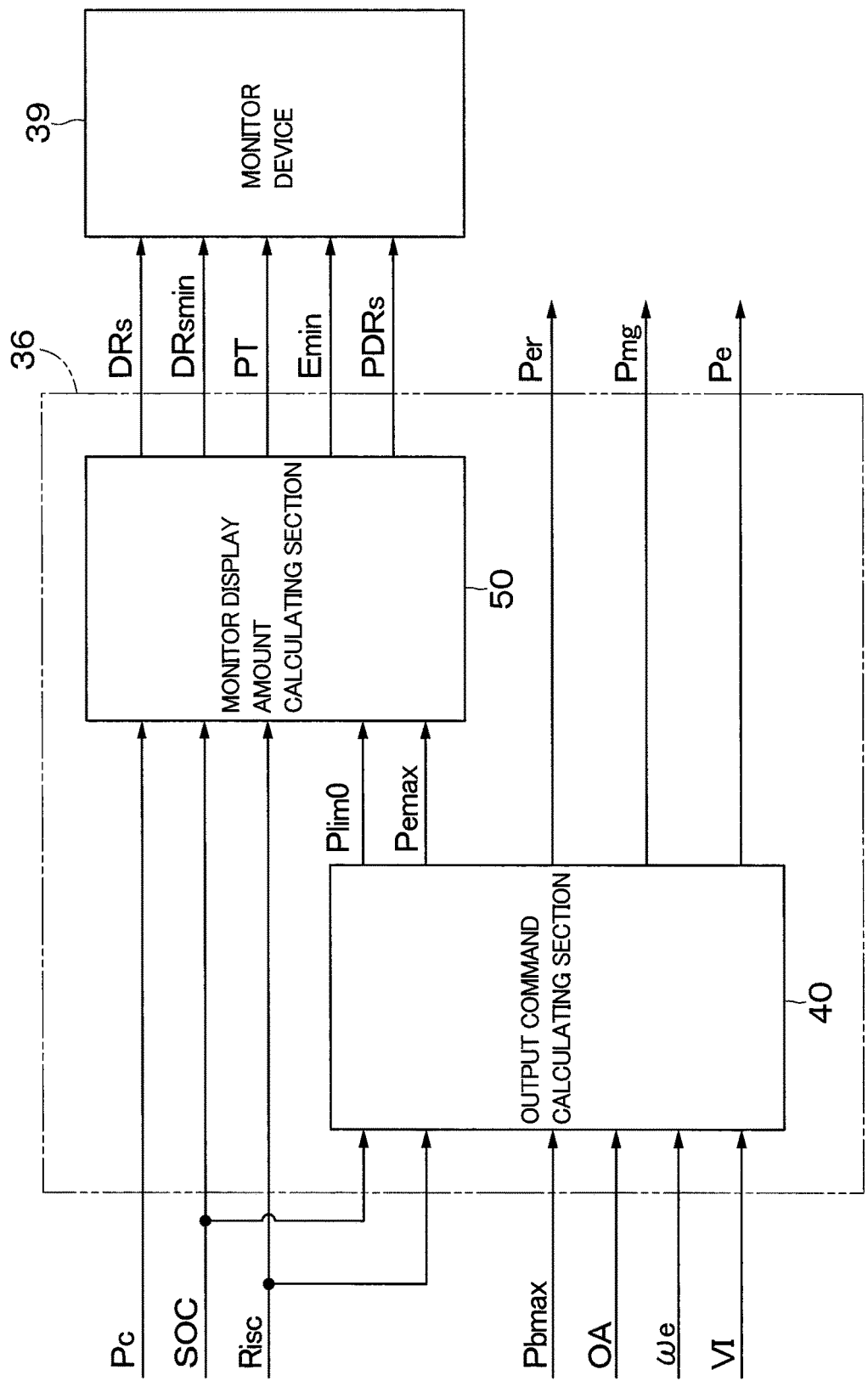
FIG. 3 is a block diagram showing a hybrid control unit and a monitor device in FIG. 2.

Next, an explanation will be made of a specific configuration of the HCU 36. As shown in FIG. 3, the HCU 36 includes an output command calculating section 40 and a monitor display amount calculating section 50.

The output command calculating section 40 configures a low speed mode executing section. The output command calculating section 40 executes the low speed mode LSMODE for, when any one of the plurality of state-amounts (the battery electricity storage rate SOC and current square integrating rate Risc) detected by the BCU 32 surpasses a given threshold (an appropriate reference value SOC1 or appropriate reference value Risc1), reducing a movement speed of each of the hydraulic actuators (the hydraulic motors 25, 26 and cylinders 12D to 12F) in accordance with the surpassing degree.

Figure 4:
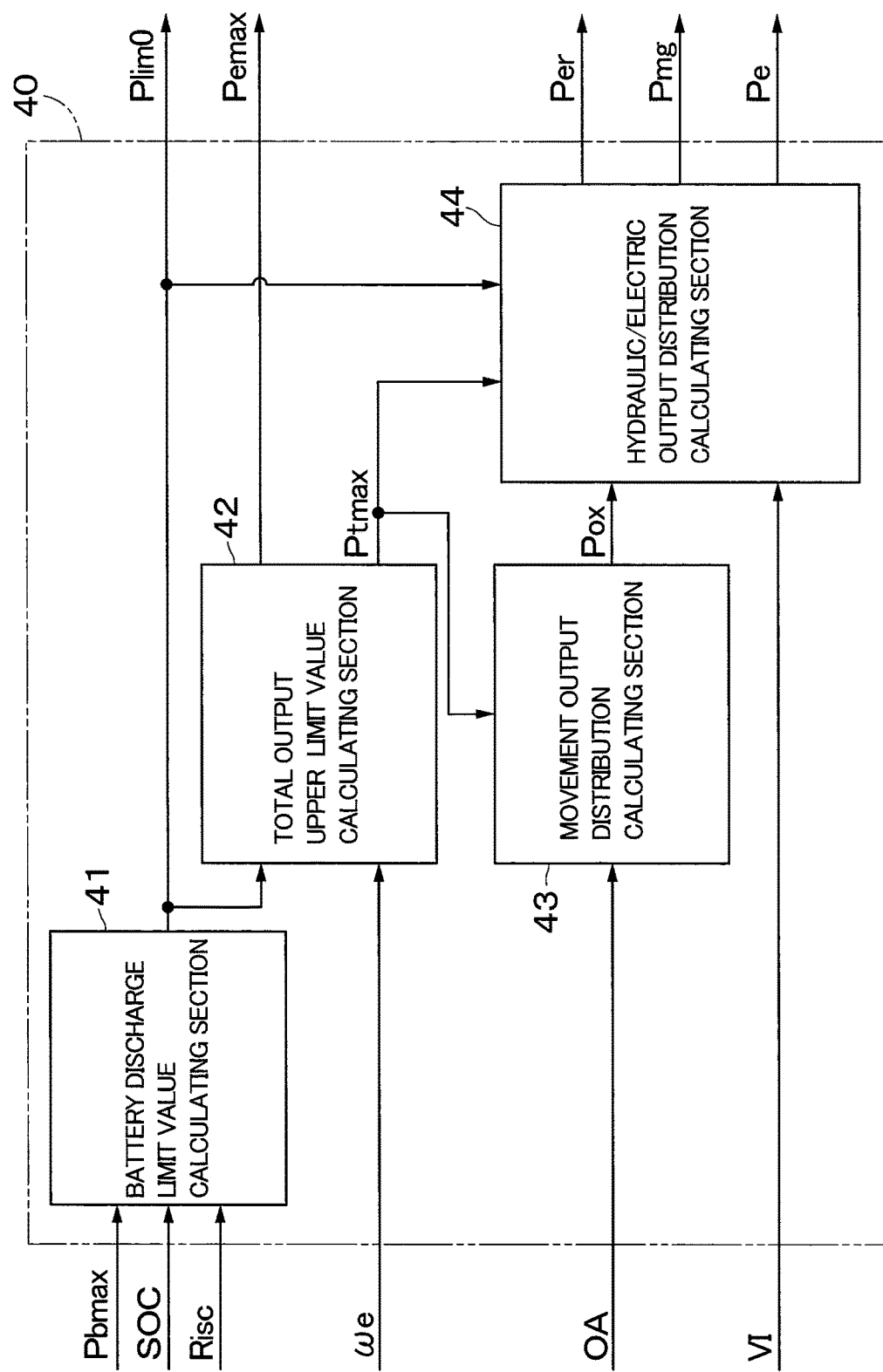
FIG. 4 is a block diagram showing an output command calculating section in FIG. 3.

As shown in FIG. 4, the output command calculating section 40 includes a battery discharge limit value calculating section 41, a total output upper limit value calculating section 42, a movement output distribution calculating section 43 and a hydraulic/electric output distribution calculating section 44. The output command calculating section 40 calculates a battery discharge power limit value Plim0, an engine output upper limit value Pemax, an engine output command Pe, an electric/revolving output command Per and a motor-generator powering operation output command Pmg based upon the battery allowance discharge power Pbmax, the battery electricity storage rate SOC, the current square integrating rate Risc, the engine target rotational speed ωe, the lever operating amount OA and other vehicle body information V1. The output command calculating section 40 outputs the battery discharge power limit value Plim0 and the engine output upper limit value Pemax to the monitor display amount calculating section 50, outputs the engine output command Pe to the ECU 22, outputs the electric/revolving output command Per to the RMCU 35 and outputs the motor-generator powering operation output command Pmg to the MGCU 30.

Figure 5:
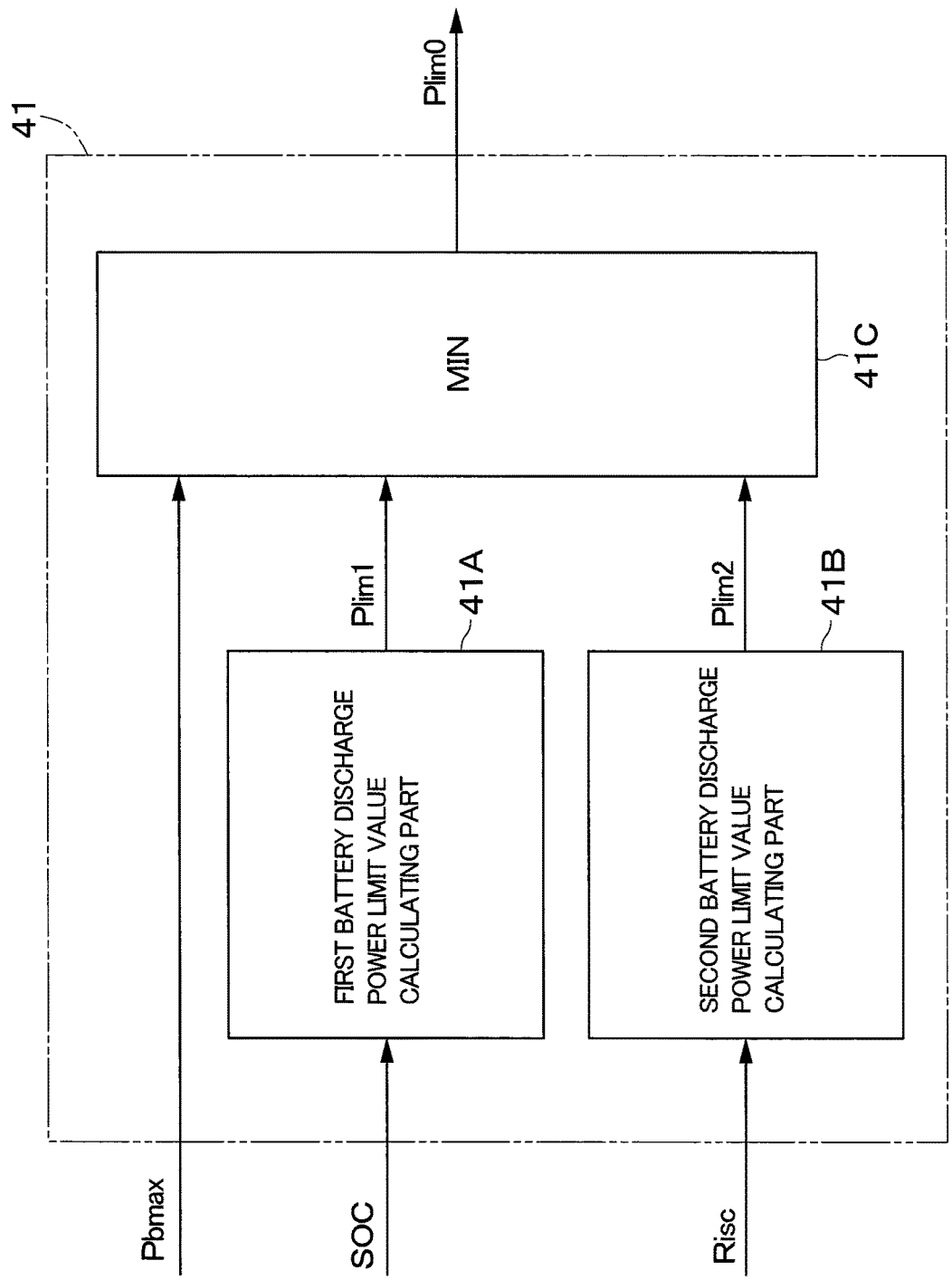
FIG. 5 is a block diagram showing a battery discharge limit value calculating section in FIG. 4.

As shown in FIG. 5, the battery discharge limit value calculating section 41 includes a first battery discharge power limit value calculating part 41A, a second battery discharge power limit value calculating part 41B and a minimum value selecting part 41C. The battery electricity storage rate SOC, the current square integrating rate Risc and the battery allowance discharge power Pbmax are input to the battery discharge limit value calculating section 41 from the BCU 32.

Figure 6:
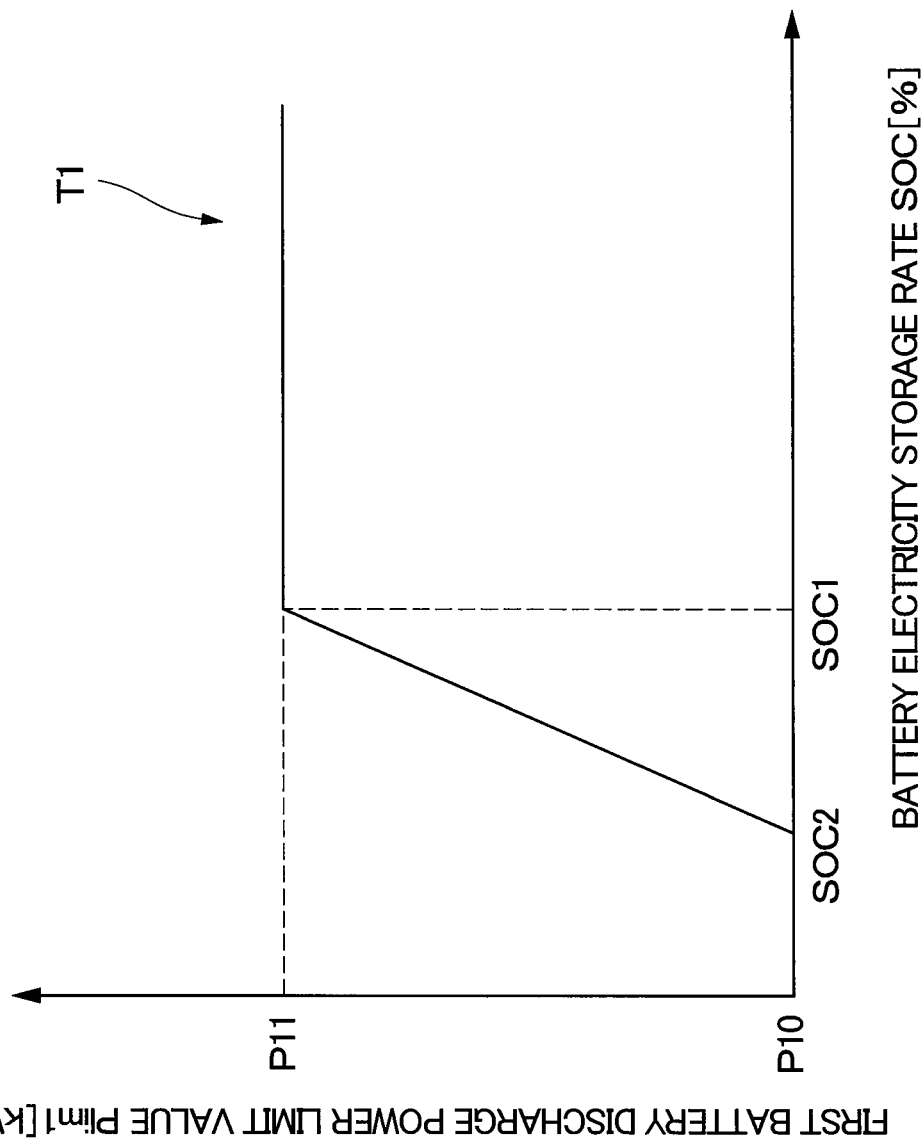
FIG. 6 is an explanatory diagram showing a table for finding a first battery discharge power limit value from a battery electricity storage rate.

Since the first battery discharge power limit value calculating part 41A, for example, has a table T1 as shown in FIG. 6 for calculating a first battery discharge power limit value Plim1 based upon the battery electricity storage rate SOC. The first battery discharge power limit value calculating part 41A uses the table 1 to calculate the first battery discharge power limit value Plim1 in accordance with the battery electricity storage rate SOC.

Figure 7:
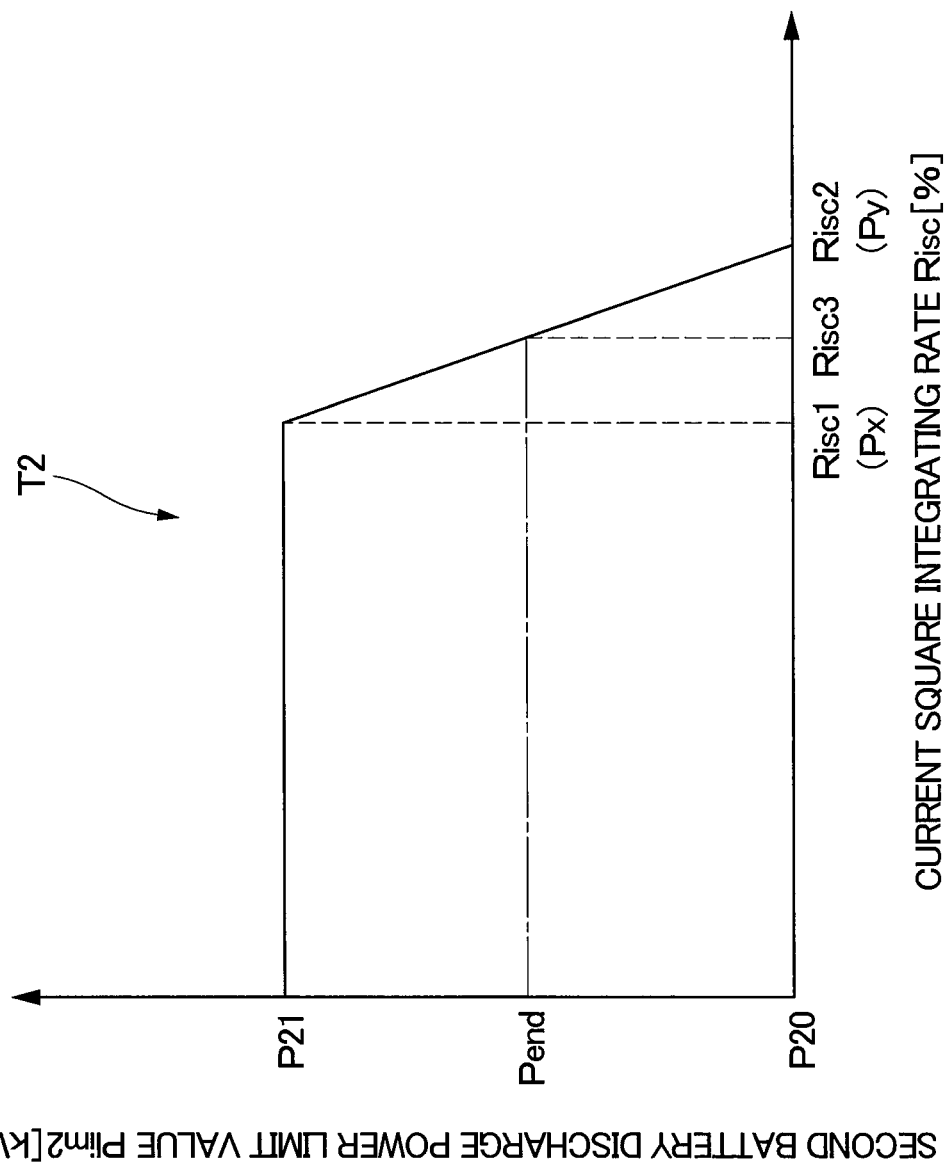
FIG. 7 is an explanatory diagram showing a table for finding a second battery discharge power limit value from a current square integrating rate.

Since the second battery discharge power limit value calculating part 41B, for example, has a table T2 as shown in FIG. 7 for calculating a second battery discharge power limit value Plim2 based upon the current square integrating rate Risc. The second battery discharge power limit value calculating part 41B uses the table 2 to calculate the second battery discharge power limit value Plim2 in accordance with the current square integrating rate Risc.

At this time, maximum values P11, P21 of the battery discharge power limit values Plim1, Plim2 in FIG. 6 and FIG. 7 are set to values close to the battery allowance discharge power Pbmax typical when the electricity storage device 31 is a new product and a cell temperature is a room temperature. Therefore, the maximum value P11 and the maximum value P21 have the same value, for example.

The table T1, when the battery electricity storage rate SOC is lower than a minimum value SOC2 in an appropriate use range, sets the battery discharge power limit value Plim1 to a minimum value P10 (for example, P10=0 kW), and when the battery electricity storage rate SOC is higher than an appropriate reference value SOC1 as a threshold, sets the battery discharge power limit value Plim1 to the maximum value P11. In addition, when the battery electricity storage rate SOC becomes a value between the minimum value SOC2 and the appropriate reference value SOC1, the table T1 increases the battery discharge power limit value Plim1 with an increase in the battery electricity storage rate SOC. That is, when the battery electricity storage rate SOC is lower than the appropriate reference value SOC1 as the threshold from a value equal to or more than the appropriate reference value SOC1, the table T1 sets the battery discharge power limit value Plim1 to a value between the minimum value P10 and the maximum value P11 in accordance with the reduction degree. Here, the appropriate reference value SOC1 is set to a large value having a predetermined margin from the minimum value SOC2. For example, when the minimum value SOC2 becomes 30%, the appropriate reference value SOC1 is set to a value of approximately 35%.

The table T2, when the current square integrating rate Risc is higher than a maximum value Risc2 in an appropriate use range, sets the battery discharge power limit value Plim2 to a minimum value P20 (for example, P20=0 kW), and when the current square integrating rate Risc is lower than an appropriate reference value Risc1 as a threshold, the table T2 sets the battery discharge power limit value Plim2 to the maximum value P21. In addition, when the current square integrating rate Risc becomes a value between the maximum value Risc2 and the appropriate reference value Risc1, the table T2 reduces the battery discharge power limit value Plim2 with an increase in the current square integrating rate Risc. That is, when the current square integrating rate Risc is higher than the appropriate reference value Risc1 as the threshold from a value equal to or less than the appropriate reference value Risc1, the table T2 sets the battery discharge power limit value Plim2 to a value between the minimum value P20 and the maximum value P21 in accordance with the increase degree. Here, the appropriate reference value Risc1 is set to a small value having a predetermined margin from the maximum value Risc2. For example, when the maximum value Risc2 becomes 100%, the appropriate reference value Risc1 is set to a value of approximately 90%.

The minimum value selecting part 41C compares the three values of the battery discharge power limit values Plim1, Plim2 calculated by the first and second battery discharge power limit value calculating parts 41A, 41B and the battery allowance discharge power Pbmax. The minimum value selecting part 41C selects a minimum value of the battery discharge power limit values Plim1, Plim2 and the battery allowance discharge power Pbmax to be outputted as the battery discharge power limit value Plim0.

Figure 8:
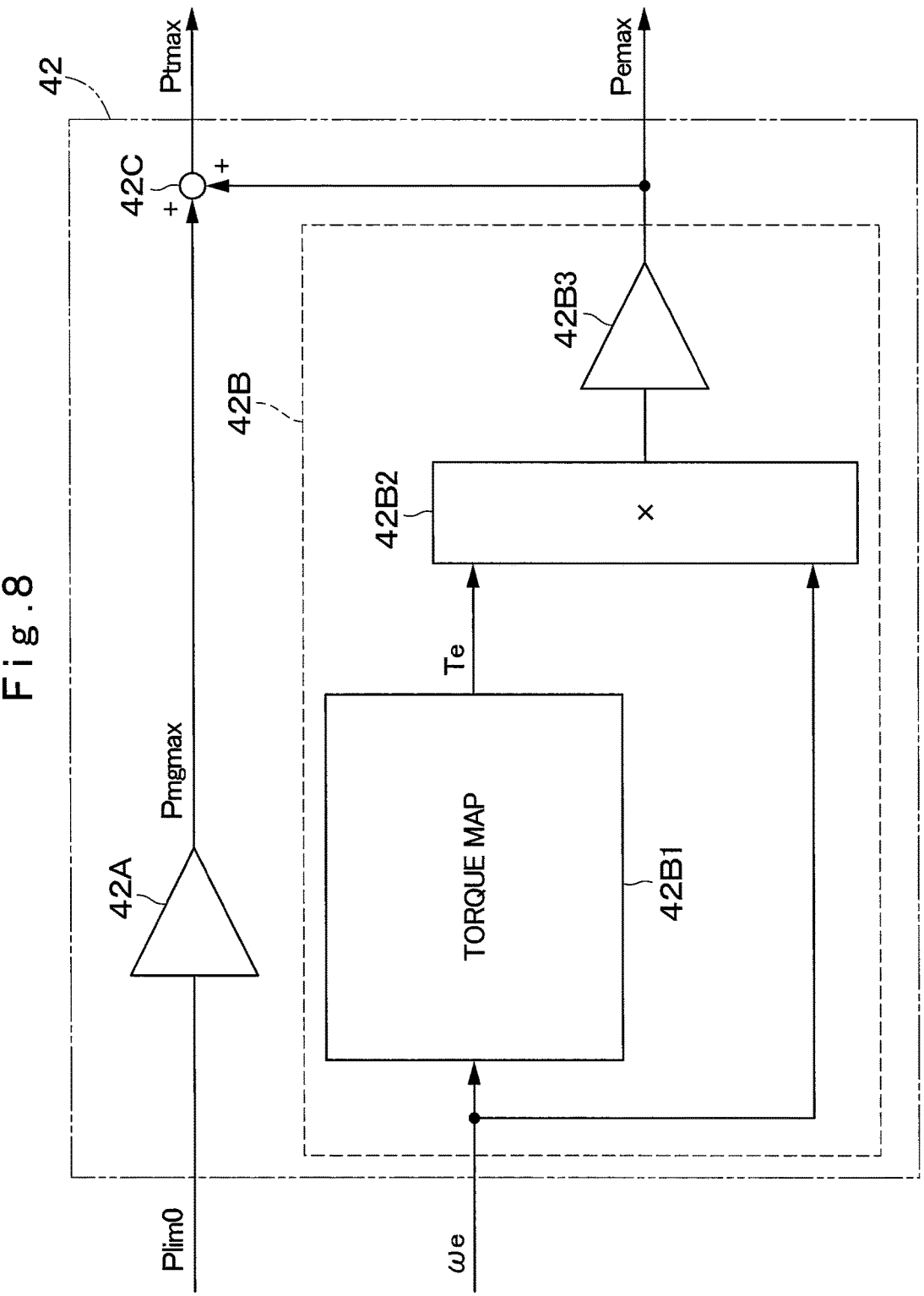
FIG. 8 is a block diagram showing a total output upper limit value calculating section in FIG. 4.

As shown in FIG. 8, the total output upper limit value calculating section 42 includes a motor-generator powering operation output upper limit value calculating part 42A, an engine output upper limit value calculating part 42B and an adder 42C. The battery discharge power limit value Plim0 and the target rotational speed ωe of the engine 21 determined by a command of the engine control dial 38 and the like are input to the total output upper limit value calculating section 42.

The motor-generator powering operation output upper limit value calculating part 42A calculates a motor-generator output upper limit value Pmgmax considering hardware restrictions such as an efficiency of the motor-generator 27. Specifically, the motor-generator powering operation output upper limit value calculating part 42A calculates the motor-generator output upper limit value Pmgmax based upon a product of an efficiency gain at the time the motor-generator 27 performs a powering operation and the battery discharge power limit value Plim0. The motor-generator output upper limit value Pmgmax indicates the output when the motor-generator 27 performs the powering operation at the maximum in a range of the battery discharge power limit value Plim0. It should be noted that the motor-generator powering operation output upper limit value calculating part 42A may calculate the motor-generator output upper limit value Pmgmax in consideration of a temperature of the motor-generator 27 and the like in addition to the efficiency of the motor-generator 27.

The engine output upper limit value calculating part 42B calculates an output maximum value of the engine 21 that can be outputted in the target rotational speed ωe to be outputted as the engine output upper limit value Pemax. The engine output upper limit value calculating part 42B includes a torque map 42B1, an engine output calculating part 42B2 and an amplifier 42B3.

The torque map 42B1 preliminarily stores a relation between the rotational speed and output torque Te of the engine 21. Therefore, the torque map 42B1, when the target rotational speed ωe of the engine 21 is input thereto, calculates the output torque Te when the engine 21 rotates in the target rotational speed ωe.

The engine output calculating part 42B2 calculates a product of the target rotational speed ωe and the output torque Te of the engine 21. The amplifier 42B3 amplifies the product of the target rotational speed ωe and the output torque Te with a gain in consideration of the efficiency of the engine 21 and the like. Thereby, the amplifier 42B3 outputs the engine output upper limit value Pemax as an output maximum value of the engine 21 when the engine 21 rotates in the target rotational speed ωe.

The adder 42C calculates a total amount (Pmgmax+Pemax) of the motor-generator output upper limit value Pmgmax as a powering operation output upper limit value of the motor-generator 27 calculated in the motor-generator powering operation output upper limit value calculating part 42A and the engine output upper limit value Pemax calculated in the engine output upper limit value calculating part 42B. The adder 42C outputs this total value as a total output upper limit value Ptmax.

The movement output distribution calculating section 43 calculates distribution of movement outputs Pox of various movements such as the traveling movement, the revolving movement and the lifting/tilting movement of the working mechanism 12 based upon the total output upper limit value Ptmax and the lever operating amount OA. The total output upper limit value Ptmax and the lever operating amount OA are input to the movement output distribution calculating section 43. The movement output distribution calculating section 43 adjusts magnitudes and the distribution of the movement outputs Pox of the various movements such that the vehicle moves in accordance with the lever operating amount OA in a range where a sum of the movement outputs does not surpass the total output upper limit value Ptmax. The movement output distribution calculating section 43 outputs each movement output Pox adjusted in the magnitude and distribution to the hydraulic/electric output distribution calculating section 44.

The battery discharge power limit value Plim0, the total output upper limit value Ptmax, each movement output Pox and the other vehicle body information VI are input to the hydraulic/electric output distribution calculating section 44. The hydraulic/electric output distribution calculating section 44 calculates the respective outputs shared by the revolving electric motor 33, the motor-generator 27 and the engine 21 such that the energy efficiency is optimal and the vehicle body movement can be performed in response to the lever operation based upon the input information. The hydraulic/electric output distribution calculating section 44 outputs the electric/revolving output command Per, the motor-generator powering operation output command Pmg and the engine output command Pe as the calculation results.

For example, the hydraulic/electric output distribution calculating section 44 calculates the electric/revolving output command Per as an output target value of the revolving electric motor 33 based upon the battery discharge power limit value Plim0 and the movement output Pox of the revolving movement. Thereby, the hydraulic/electric output distribution calculating section 44 supplies as much electric power as possible to the powering operation of the revolving electric motor 33 in a range of not surpassing the battery discharge power limit value Plim0.

The movements other than the revolving movement are performed by the pressurized oil delivered from the hydraulic pump 23. Therefore, the hydraulic/electric output distribution calculating section 44 subtracts a section of the electric/revolving output command Per from the sum of the movement outputs Pox to calculate an output target value of the hydraulic pump 23. The hydraulic/electric output distribution calculating section 44 calculates the engine output command Pe as an output target value of the engine 21 necessary for acquiring the output target value of the hydraulic pump 23. In addition, when the output target value of the engine 21 surpasses the output upper limit value of the engine 21, the difference is complemented by the powering operation of the motor-generator 27. Therefore, the hydraulic/electric output distribution calculating section 44 calculates the motor-generator powering operation output command Pmg as an output target of the motor-generator 27 based upon the difference between the output target value and the output upper limit value of the engine 21.

Thereby, the output command calculating section 40 executes the normal mode NMODE when the battery electricity storage rate SOC and the current square integrating rate Risc are in a range of a given threshold, and outputs the electric/revolving output command Per, the motor-generator powering operation output command Pmg and the engine output command Pe in accordance with the lever operating amount OA. On the other hand, the output command calculating section 40 executes the low speed mode LSMODE when the battery electricity storage rate SOC is lower than a given threshold (appropriate reference value SOC1) or when the current square integrating rate Risc is higher than a given threshold (appropriate reference value Risc1). As a result, the output command calculating section 40 lowers the electric/revolving output command Per, the motor-generator powering operation output command Pmg and the engine output command Pe in accordance with the degree when the battery electricity storage rate SOC or the current square integrating rate Risc surpasses the given threshold to reduce the movement speeds of the hydraulic motors 25, 26 and the cylinders 12D to 12F.

It should be noted that the hydraulic/electric output distribution calculating section 44 may optionally adjust the electric/revolving output command Per, the motor-generator powering operation output command Pmg and the engine output command Pe based upon the total output upper limit value Ptmax and the other vehicle body information VI. At this time, the other vehicle body information VI corresponds to, for example, a vehicle speed, a cooling water temperature, a fuel remaining amount and the like. The calculation methods for the electric/revolving output command Per, the motor-generator powering operation output command Pmg and the engine output command Pe are not limited to the above-mentioned methods, but may be optionally set in accordance with a specification of a vehicle or the like in a range where the output of the entire vehicle does not surpass the total output upper limit value Ptmax.

The HCU 36 further calculates a revolving electric motor torque command, a motor-generator powering operation torque command and an engine rotational speed command based upon the electric/revolving output command Per, the motor-generator powering operation output command Pmg and the engine output command Pe to be outputted to the RMCU 35, the MGCU 30, the ECU 22 and the BCU 32. The RMCU 35, the MGCU 30, the ECU 22 and the BCU 32 control the revolving electric motor 33, the motor-generator 27, the engine 21 and the electricity storage device 31 to realize the respective commands, realizing the vehicle body movement in accordance with requirements of an operator.

Figure 9:
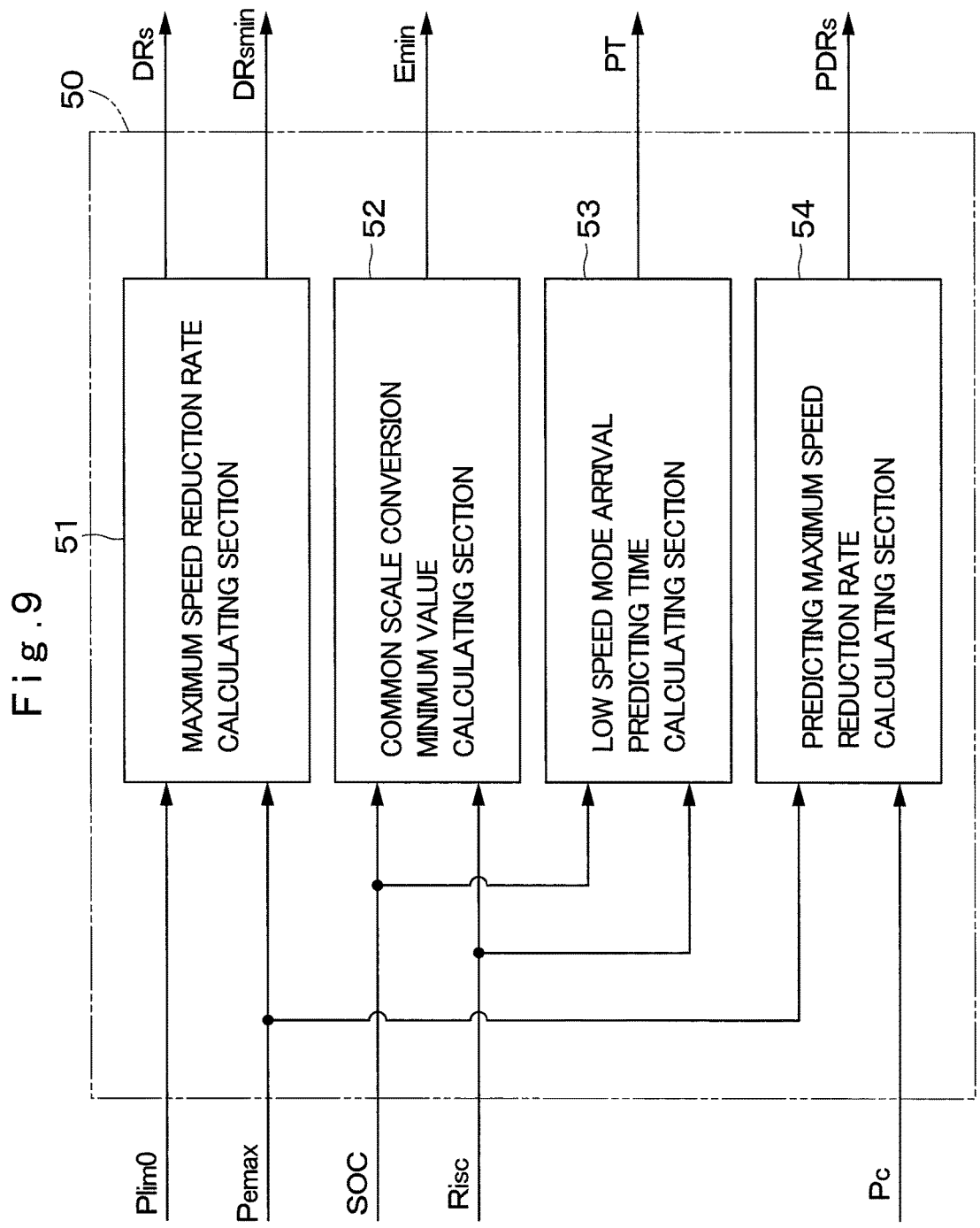
FIG. 9 is an explanatory diagram showing a monitor display amount calculating section in FIG. 3.

The monitor display amount calculating section 50 calculates the maximum speed reduction rate DRs, the maximum speed reduction rate minimum value DRsmin, the common scale conversion minimum value Emin, the low speed mode arrival predicting time PT and the predicting maximum speed reduction rate PDRs based upon the battery discharge power limit value Plim0, the engine output upper limit value Pemax, the battery electricity storage rate SOC, the current square integrating rate Risc and the battery power value Pc. As shown in FIG. 9, the monitor display amount calculating section 50 includes a maximum speed reduction rate calculating section 51, a common scale conversion minimum value calculating section 52, a low speed mode arrival predicting time calculating section 53 and a predicting maximum speed reduction rate calculating section 54.

Figure 10:
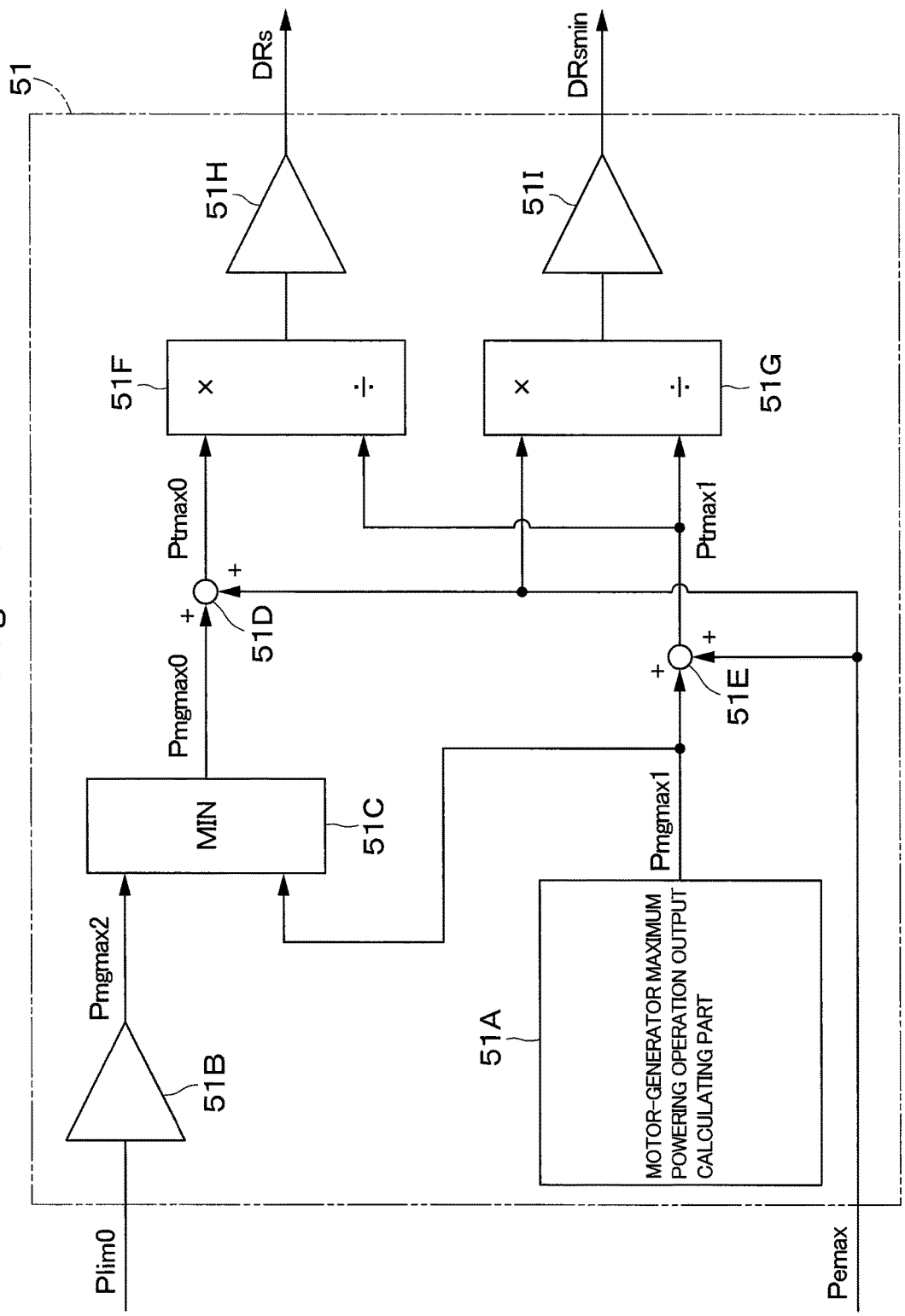
FIG. 10 is a block diagram showing a maximum speed reduction rate calculating section in FIG. 9.

The maximum speed reduction rate calculating section 51 configures a speed reduction degree calculating section. The maximum speed reduction rate calculating section 51 calculates a speed reduction degree of a speed of each of the hydraulic actuators (the hydraulic motors 25, 26 and the cylinders 12D to 12F) in the low speed mode LSMODE. Specifically, the maximum speed reduction rate calculating section 51 calculates the maximum speed reduction rate DRs and the maximum speed reduction rate minimum value DRsmin based upon the battery discharge power limit value Plim0 and the engine output upper limit value Pemax. As shown in FIG. 10, the maximum speed reduction rate calculating section 51 includes a motor-generator maximum powering operation output calculating part 51A, a motor-generator powering operation output calculating part 51B, a minimum value selecting part 51C, a total output calculating part 51D, a maximum total output calculating part 51E, first and second rate calculating parts 51F, 51G and percentage conversion parts 51H, 51I.

The motor-generator maximum powering operation output calculating part 51A calculates maximum output acquired by a powering operation of the motor-generator 27 in a state where the battery discharge power from the electricity storage device 31 is not restricted, as a first motor-generator maximum powering operation output Pmgmax1.

The motor-generator powering operation output calculating part 51B is configured substantially in the same way as, for example, the motor-generator powering operation output upper limit value calculating part 42A. Therefore, the motor-generator maximum powering operation output calculating part 51A calculates second motor-generator maximum powering operation output Pmgmax2 based upon, for example, a product of an efficiency gain at the time the motor-generator 27 performs a powering operation and the battery discharge power limit value Plim0. The second motor-generator maximum powering operation output Pmgmax2 indicates maximum output acquired by the powering operation of the motor-generator 27 in a state where the battery discharge power from the electricity storage device 31 is restricted by the battery discharge power limit value Plim0. The second motor-generator maximum powering operation output Pmgmax2 is substantially the same value as the motor-generator output upper limit value Pmgmax by the motor-generator powering operation output upper limit value calculating part 42A.

The minimum value selecting part 51C compares the first motor-generator maximum powering operation output Pmgmax1 by the motor-generator maximum powering operation output calculating part 51A and the second motor-generator maximum powering operation output Pmgmax2 by the motor-generator maximum powering operation output calculating part 51B. The minimum value selecting part 51C selects a minimum value of the first motor-generator maximum powering operation output Pmgmax1 and the second motor-generator maximum powering operation output Pmgmax2 to be outputted as motor-generator maximum powering operation output Pmgmax0.

The total output calculating part 51D is configured of an adder. The total output calculating part 51D adds the motor-generator maximum powering operation output Pmgmax0 and the engine output upper limit value Pemax, and outputs a total value thereof as total output Ptmax0.

The maximum total output calculating part 51E is configured of an adder. The maximum total output calculating part 51E adds the motor-generator maximum powering operation output Pmgmax1 and the engine output upper limit value Pemax, and outputs a total value thereof as maximum total output Ptmax1.

The first rate calculating part 51F divides the total output Ptmax0 by the maximum total output Ptmax1, and calculates this ratio (Ptmax0/Ptmax1). This ratio (Ptmax0/Ptmax1) is converted into a percentage value by being multiplied by a given efficient in the percentage conversion part 51H. As a result, the percentage conversion part 51H outputs the maximum speed reduction rate DRs in accordance with a ratio of the total output Ptmax0 and the maximum total output Ptmax1.

The second rate calculating part 51G divides the engine output upper limit value Pemax by the maximum total output Ptmax1, and calculates this ratio (Pemax/Ptmax1). This ratio (Pemax/Ptmax1) is converted into a percentage value by being multiplied by a given efficient in the percentage conversion part 51I. Here, when the low speed mode LSMODE is executed and the electric power supply from the electricity storage device 31 is stopped, various movements are to be performed by the output of the engine 21. At this time, a maximum value of the movement output corresponds to the engine output upper limit value Pemax. Therefore, the ratio (Pemax/Ptmax1) corresponds to a minimum value of the maximum speed reduction rate DRs. As a result, the percentage conversion part 51I outputs the maximum speed reduction rate minimum value DRsmin in accordance with the ratio of the engine output upper limit value Pemax and the maximum total output Ptmax1.

The common scale conversion minimum value calculating section 52 configures a common scale representative value specifying section. The common scale conversion minimum value calculating section 52 converts a region of not transferring in the low speed mode LSMODE to each of a plurality of state-amounts (the battery electricity storage rate SOC and current square integrating rate Risc) indicative of a state of the electricity storage device 31 into a common scale, and thereby, converts the present value of each of the plurality of state-amounts into a value of the common scale to specify any one of these values as a representative value.

Figure 11:
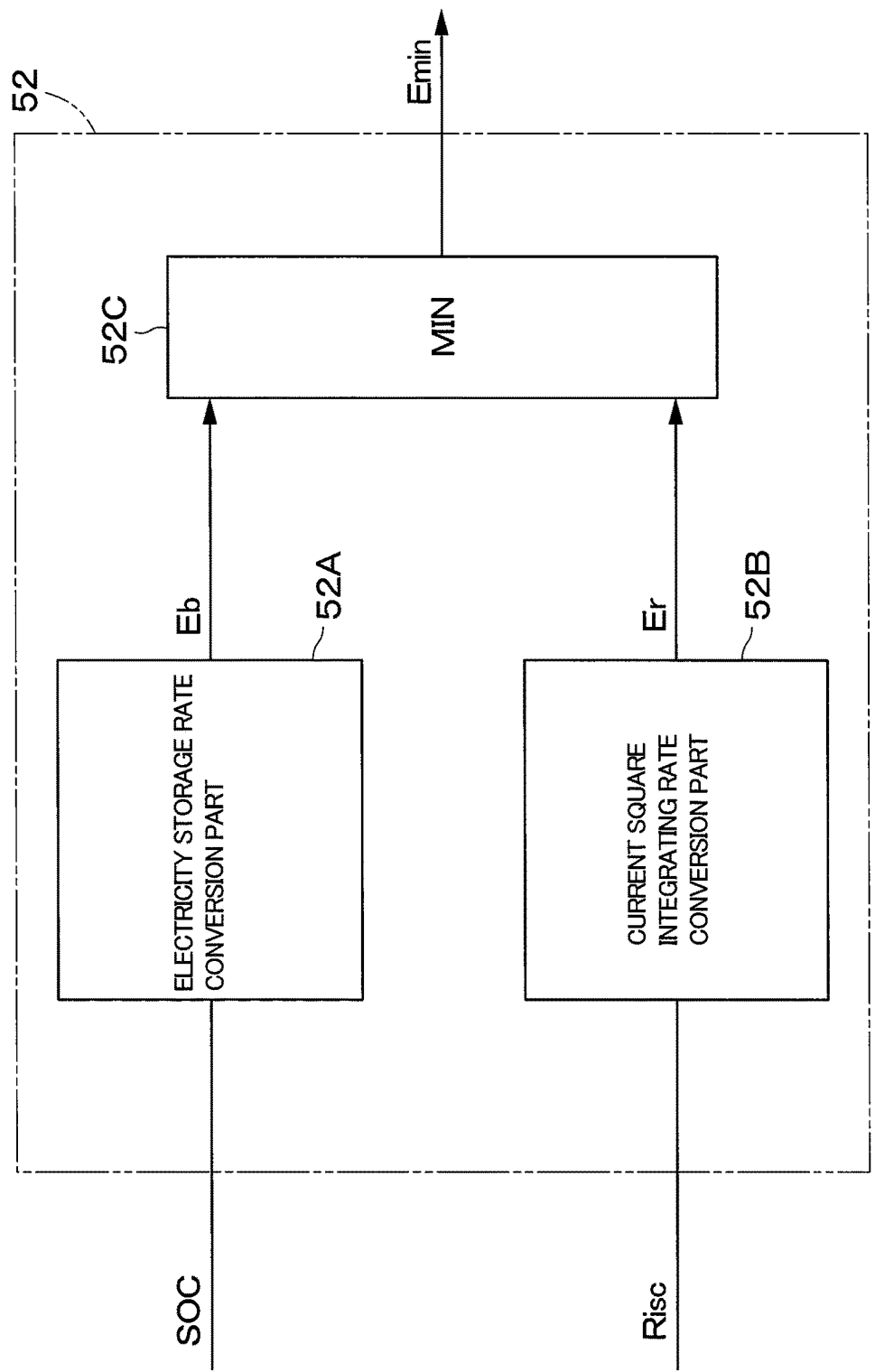
FIG. 11 is a block diagram showing a common scale conversion minimum value calculating section in FIG. 9.

Specifically, the common scale conversion minimum value calculating section 52 calculates the common scale conversion minimum value Emin based upon the battery electricity storage rate SOC and the current square integrating rate Risc. The common scale conversion minimum value Emin, when the battery electricity storage rate SOC and the current square integrating rate Risc are converted into values of the common scale, indicates a minimum value of the two values. As shown in FIG. 11, the common scale conversion minimum value calculating section 52 includes an electricity storage rate conversion part 52A, a current square integrating rate conversion part 52B and a minimum value selecting part 52C.

The electricity storage rate conversion part 52A converts the battery electricity storage rate SOC into a first conversion value Eb of the predetermined common scale (for example, percentage). As shown in FIG. 6, a range where the battery discharge power is not restricted, that is, a range where the battery discharge power limit value Plim1 is 100% (Plim1=P11) exists in the battery electricity storage rate SOC. For example, when the battery electricity storage rate SOC has an appropriate use range of 30% to 70%, the electricity storage device 31 is controlled to reach 60% as a target value of the battery electricity storage rate SOC for causing allowance to the upper limit. In addition, the electricity storage device 31 is controlled such that the battery electricity storage rate SOC is normally 35% or more for causing allowance to the lower limit as well.

When the battery electricity storage rate SOC is lower than 35%, the battery discharge power limit value Plim1 is also lowered. That is, how higher the battery electricity storage rate SOC is as compared to 35% indicates the allowance of the battery electricity storage rate SOC. Therefore, the electricity storage rate conversion part 52A converts a range of 35% to 60% as the battery electricity storage rate SOC into a percentage value. As a result, when the battery electricity storage rate SOC is 60% as the target value, the first conversion value Eb becomes 100%, and when the battery electricity storage rate SOC is 35%, the first conversion value Eb becomes 0%.

The current square integrating rate conversion part 52B converts the current square integrating rate Risc into a second conversion value Er of the predetermined common scale (for example, percentage). As shown in FIG. 7, a range where the battery discharge power is not restricted, that is, a range where the battery discharge power limit value Plim2 is 100% (Plim2=P21) exists in the current square integrating rate Risc. For example, the electricity storage device 31 is controlled such that the current square integrating rate Risc becomes in a range of 0% to 90%. When the current square integrating rate Risc increases to be higher than 90%, the battery discharge power limit value Plim2 is lowered. That is, how lower the current square integrating rate Risc is as compared to 90% indicates the allowance of the current square integrating rate Risc. Therefore, the current square integrating rate conversion part 52B converts a range of 0% to 90% as the current square integrating rate Risc into a percentage value. As a result, when the current square integrating rate Risc is 0%, the second conversion value Er becomes 100%, and when the current square integrating rate Risc is 90%, the second conversion value Er becomes 0%.

The minimum value selecting part 52C compares the first conversion value Eb by the electricity storage rate conversion part 52A and the second conversion value Er by the current square integrating rate conversion part 52B. The minimum value selecting part 52C selects a minimum value of the first conversion value Eb and the second conversion value Er to be outputted as the common scale conversion minimum value Emin.

Figure 12:
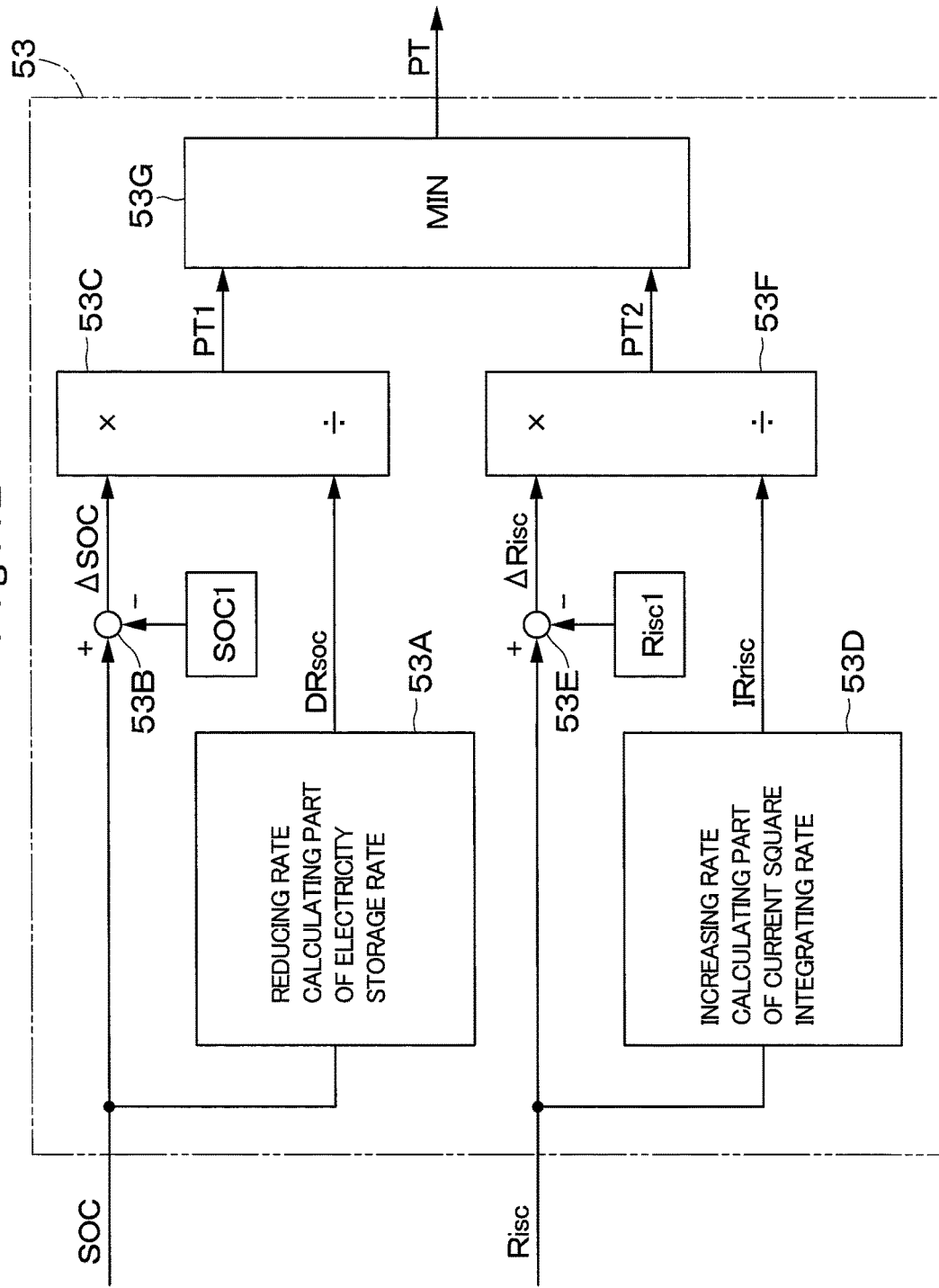
FIG. 12 is a block diagram showing a low speed mode arrival predicting time calculating section in FIG. 9.

The low speed mode arrival predicting time calculating section 53 configures a low speed mode arrival time predicting section. The low speed mode arrival predicting time calculating section 53 predicts the low speed mode arrival predicting time PT until arriving in the low speed mode LSMODE based upon a reducing speed or an increasing speed of each value of a plurality of state-amounts (the battery electricity storage rate SOC and current square integrating rate Risc). Specifically, the low speed mode arrival predicting time calculating section 53 calculates the low speed mode arrival predicting time PT based upon the battery electricity storage rate SOC and the current square integrating rate Risc. As shown in FIG. 12, the low speed mode arrival predicting time calculating section 53 includes a reducing rate calculating part 53A of an electricity storage rate, a subtracter 53B, a first predicting time calculating part 53C, an increasing rate calculating part 53D of a current square integrating rate, a subtracter 53E, a second predicting time calculating part 53F and a minimum value calculating part 53G.

The reducing rate calculating part 53A of the electricity storage rate calculates a reducing rate DRsoc of the electricity storage rate indicative of a reducing rate of the battery electricity storage rate SOC based upon the battery electricity storage rate SOC. Specifically, the reducing rate calculating part 53A of the electricity storage rate measures a changing component of the battery electricity storage rate SOC for a predetermined given time, and calculates the reducing rate DRsoc of the electricity storage rate based upon a relation of this changing component and the given time. A cycle time of a loading movement as a general work is approximately 20 sec. In consideration of this point, the given time for calculating the reducing rate DRsoc of the electricity storage rate is set to, for example, approximately 30 sec with some allowance to the cycle time of the loading work.

The subtracter 53B subtracts a given threshold (appropriate reference value SOC1) from the battery electricity storage rate SOC. At this time, when the battery electricity storage rate SOC is lower than the appropriate reference value SOC1, the first battery discharge power limit value Plim1 is lowered from 100%. Therefore, the subtracter 53B calculates an allowance component ΔSOC of the battery electricity storage rate SOC until the battery discharge power is restricted.

The first predicting time calculating part 53C calculates a first arrival predicting time PT1 until the transfer to the low speed mode LSMODE based upon the battery electricity storage rate SOC by dividing the allowance component ΔSOC by the reducing rate DRsoc of the electricity storage rate.

The increasing rate calculating part 53D of the current square integrating rate calculates an increasing rate IRrisc of the current square integrating rate indicative of an increasing rate of the current square integrating rate Risc based upon the current square integrating rate Risc. Specifically, the increasing rate calculating part 53D of the current square integrating rate measures a changing component of the current square integrating rate Risc for a predetermined given time (for example, approximately 30 sec), and calculates the increasing rate IRrisc of the current square integrating rate based upon a relation between this changing component and the given time.

The subtracter 53E subtracts a given threshold (appropriate reference value Risc1) from the current square integrating rate Risc. At this time, when the current square integrating rate Risc is higher than the appropriate reference value Risc1, the second battery discharge power limit value Plim2 is lowered from 100%. Therefore, the subtracter 53E calculates an allowance component ΔRisc of the current square integrating rate Risc until the battery discharge power is restricted.

The second predicting time calculating part 53F calculates a second arrival predicting time PT2 until the transfer to the low speed mode LSMODE based upon the current square integrating rate Risc by dividing the allowance component ΔRisc by the increasing rate IRrisc of the current square integrating rate.

The minimum value calculating part 53G compares the first arrival predicting time PT1 by the first predicting time calculating part 53C and the second arrival predicting time PT2 by the second predicting time calculating part 53F. The minimum value calculating part 53G outputs a minimum value of the first arrival predicting time PT1 and the second arrival predicting time PT2 as the low speed mode arrival predicting time PT.

Figure 13:
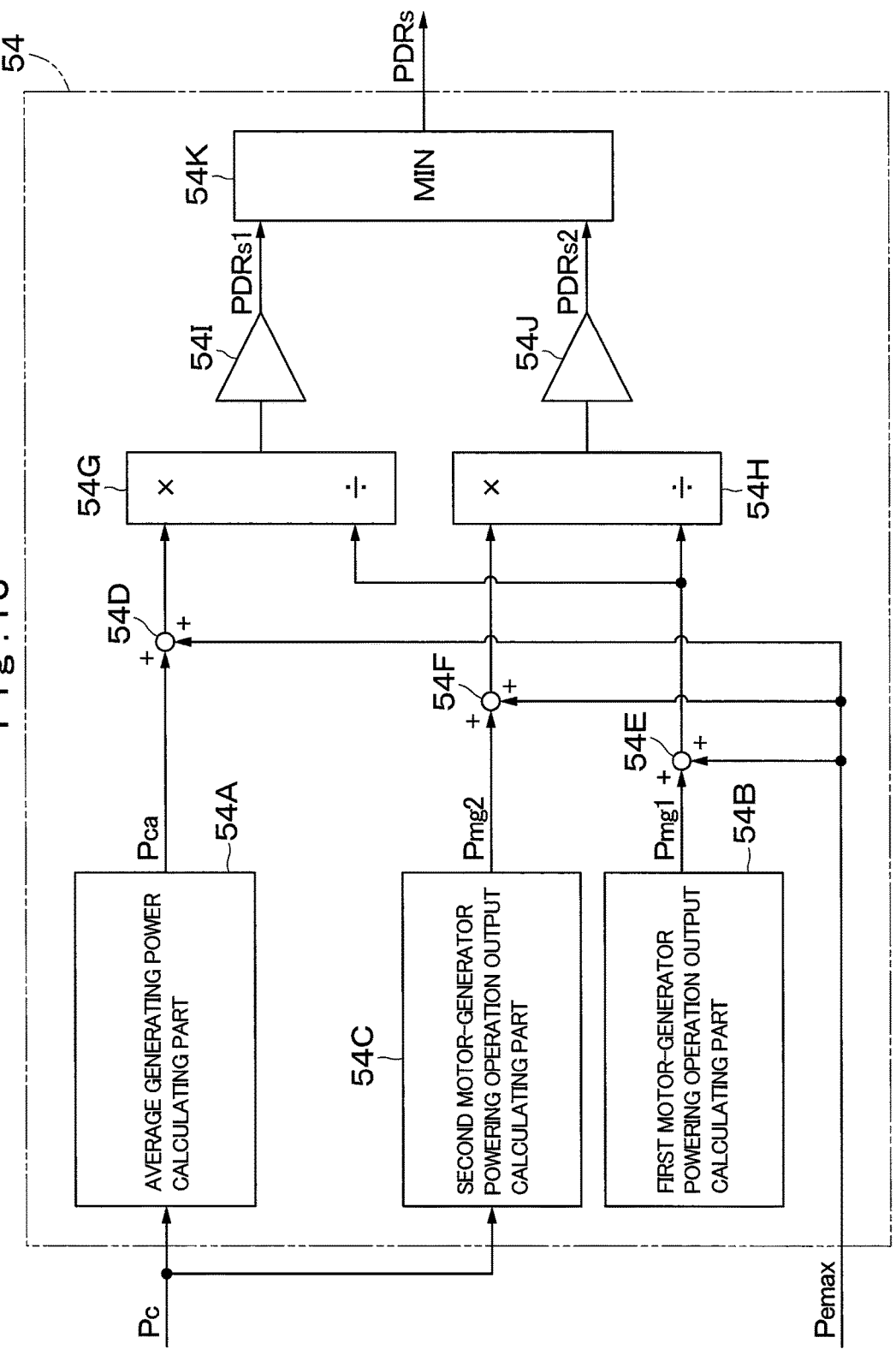
FIG. 13 is a block diagram showing a predicting maximum speed reduction rate calculating section in FIG. 9.

The predicting maximum speed reduction rate calculating section 54 configures a speed reduction degree predicting value calculating section. The predicting maximum speed reduction rate calculating section 54 calculates a predicting value of a speed reduction degree of a speed of the hydraulic actuator at the transferring to the low speed mode LSMODE when it is determined to transfer to the low speed mode LSMODE based upon an increasing/reducing speed of each value of the plurality of state-amounts of the electricity storage device 31. Specifically, the predicting maximum speed reduction rate calculating section 54 calculates the predicting maximum speed reduction rate PDRs based upon the battery power value Pc and the engine output upper limit value Pemax. As shown in FIG. 13, the predicting maximum speed reduction rate calculating section 54 includes an average generating power calculating part 54A, a first motor-generator powering operation output calculating part 54B, a second motor-generator powering operation output calculating part 54C, adders 54D to 54F, first and second rate calculating parts 54G, 54H, percentage conversion parts 54I, 54J and a minimum value selecting part 54K.

The average generating power calculating part 54A calculates electric charging power of the electricity storage device 31 for a predetermined given time based upon the battery power value Pc to output an average generating power Pca. At this time, the given time for calculating the average generating power Pca is set to, for example, approximately 30 sec corresponding to the given time at the time of calculating the reducing rate of the battery electricity storage rate SOC.

The first motor-generator powering operation output calculating part 54B is configured substantially in the same way as, for example, the motor-generator maximum powering operation output calculating part 51A. Therefore, the first motor-generator maximum powering operation output calculating part 54B calculates maximum power acquired by the powering operation of the motor-generator 27 as a first motor-generator powering operation output Pmg1 in a state where the battery discharge power from the electricity storage device 31 is not restricted. At this time, the first motor-generator powering operation output Pmg1 is substantially the same value as the first motor-generator maximum powering operation output Pmgmax1.

The second motor-generator powering operation output calculating part 54C calculates, for example, a second motor-generator powering operation output Pmg2 in consideration of an efficiency of the motor-generator 27 to an electric power conversion value of an upper limit value of the current square integrating value. At this time, the second motor-generator powering operation output Pmg2 is a value when the vehicle speed is lowered based upon an increase in the current square integrating rate Risc, and corresponds to the output of the motor-generator 27 at the time of driving the electricity storage device 31 by a value acquired by the electric power conversion of the upper limit value in the current square integrating value.

The second motor-generator powering operation output calculating part 54C, as hereinafter described, calculates the second motor-generator powering operation output Pmg2 based upon the battery power value Pc. First, an appropriate reference power Px corresponding to the appropriate reference value Risc1 of the current square integrating rate Risc shown in FIG. 7 is in advance found. This power Px is calculated by a product of the current in accordance with the appropriate reference value Risc1 and the voltage of the electricity storage device 31. At this time, the voltage of the electricity storage device 31 is defined as a constant value, for example. Likewise, a maximum power Py corresponding to a maximum value Risc2 of the current square integrating rate Risc is in advance found. This power Py is calculated by a product of the current in accordance with the maximum value Risc2 and the voltage of the electricity storage device 31.

On the other hand, an effective power Pnow is calculated based upon the current value between the present time and time T0 tracing back to the past. The effective power Pnow can be calculated based upon the battery power value Pc. It should be noted that preferably the time T0 is, for expressing a use way of the present electricity storage device 31, for example, a time longer than a cycle time (for example, approximately 20 sec) of a gravel loading movement and sorter than an integrated time T (for example, T=100 sec) of the current square integrating value. Therefore, the time T0 is set to, for example, approximately 30 sec.

When the effective power Pnow is the appropriate reference power Px or less (Pnow≤Px), even when the present movement continues to be performed, the current square integrating rate Risc does not surpass the appropriate reference value Risc1. In this case, it is not necessary to restrict the battery discharge power.

On the other hand, when the effective power Pnow is larger than the appropriate reference power Px (Pnow>Px), when the present movement continues to be performed, the current square integrating rate Risc will surpass the appropriate reference value Risc1 in the future. In this case, since the battery discharge power is restricted based upon the current square integrating rate Risc, the current square integrating rate Risc converges into some value between the appropriate reference value Risc1 and the maximum value Risc2. In a region where the effective power Pnow is larger than the appropriate reference power Px, a value into which the current square integrating rate Risc finally converges is indicated at a converging value Risc3, and the battery discharge power limit value Plim2 in accordance with the converging value Risc3 is indicated at a predicting limit value Pend. As shown in FIG. 7, since the current square integrating rate Risc is in proportion to the battery discharge power limit value Plim2 in this region, a relation indicated in Formula 1 as follows is established to the predicting limit value Pend based upon a geometric similarity.

$$P21:(Risc2-Risc1)=Pend:(Risc2-Risc3) \quad \text{[Formula 1]}$$

When the electric power in accordance with the converging value Risc3 becomes the predicting limit value Pend, both are in a balancing state. Therefore, when the appropriate reference value Risc1, the maximum value Risc2 and the converging value Risc3 are replaced by electric powers (the appropriate reference power Px, the maximum power Py and the predicting limit value Pend) corresponding to the respective values, the predicting limit value Pend can be expressed by Formula 2 as follows.

$$Pend = \frac{Py \times P21}{Py - Px + P21} \quad \text{[Formula 2]}$$

Accordingly, when the output begins to be restricted by the current square integrating rate Risc, in a case where the movement is performed by the electric power larger than the appropriate reference power Px corresponding to the appropriate reference value Risc1, the output converges into a restriction state of moving in the predicting limit value Pend finally indicated in Formula 2 regardless of the magnitude.

Therefore, the second motor-generator powering operation output calculating part 54C calculates the effective power Pnow based upon the battery power value Pc, and compares the effective power Pnow and the appropriate reference power Px. When the effective power Pnow is lower than the appropriate reference power Px, the second motor-generator powering operation output calculating part 54C outputs the maximum value P21 of the battery discharge power limit value Plim2 as the second motor-generator powering operation output Pmg2. On the other hand, when the effective power Pnow is larger than the appropriate reference power Px, the second motor-generator powering operation output calculating part 54C outputs the predicting limit value Pend acquired in Formula 2 as the second motor-generator powering operation output Pmg2. It should be noted that the predicting limit value Pend changes with the magnitudes of the appropriate reference value Risc1, the maximum value Risc2 and the maximum value P21. Therefore, the predicting limit value Pend is optionally set in accordance with, for example, specifications of the hydraulic excavator 1, the electricity storage device 31 and the like.

The adder 54D adds the average generating power Pca and the engine output upper limit value Pemax. The adder 54E adds the first motor-generator powering operation output Pmg1 and the engine output upper limit value Pemax. The adder 54F adds the second motor-generator powering operation output Pmg2 and the engine output upper limit value Pemax.

The first rate calculating part 54G divides the additional value (Pca+Pemax) by the adder 54D by the additional value (Pmg1+Pemax) by the adder 54E, and calculates this ratio ((Pca+Pemax)/(Pmg1+Pemax)). This ratio ((Pca+Pemax)/(Pmg1+Pemax)) is converted into a percentage value by being multiplied by a given coefficient in the percentage conversion part 54I. As a result, at the transferring to the low speed mode LSMODE based upon a reduction in the battery electricity storage rate SOC, the percentage conversion part 54I outputs a first predicting maximum speed reduction rate PDRs1 as a maximum speed reduction rate predicted at this time.

The second rate calculating part 54H divides the additional value (Pmg2+Pemax) by the adder 54F by the additional value (Pmg1+Pemax) by the adder 54E, and calculates this ratio ((Pmg2+Pemax)/(Pmg1+Pemax)). This ratio ((Pmg2+Pemax)/(Pmg1+Pemax)) is converted into a percentage value by being multiplied by a given coefficient in the percentage conversion part 54J. As a result, at the transferring to the low speed mode LSMODE based upon an increase in the current square integrating rate Risc, the percentage conversion part 54J outputs a second predicting maximum speed reduction rate PDRs2 as a maximum speed reduction rate predicted at this time.

A minimum value selecting part 54K compares the first and second predicting maximum speed reduction rates PDRs1, PDRs2. The minimum value selecting part 54K selects a minimum value of the first predicting maximum speed reduction rate PDRs1 and the second predicting maximum speed reduction rate PDRs2 to be outputted as the predicting maximum speed reduction rate PDRs.

The hybrid hydraulic excavator according to the present embodiment has the configuration as described above, and next, an explanation will be made of a display content of the monitor device 39 based upon a state of the electricity storage device 31 with reference to FIG. 17 to FIG. 21. It should be noted that FIG. 17 to FIG. 21 show an example of a case where the maximum speed reduction rate minimum value DRsmin is 70%. In addition, the predicting limit value Pend is set to such a value that the second predicting maximum speed reduction rate PDRs2 becomes 80%. FIG. 17 to FIG. 21 show each example of the maximum speed reduction rate DRs, the common scale conversion minimum value Emin, the low speed mode arrival predicting time PT and the predicting maximum speed reduction rate PDRs. These values may be optionally changed in accordance with the specification of the hydraulic excavator 1 and the like.

First, an explanation will be made of the display content in the monitor device 39 before use start of the electricity storage device 31 with reference to FIG. 17. At this time, the battery electricity storage rate SOC is 60% as the maximum value in a normal use range. In addition, the current square integrating rate Risc is 0% since the electricity storage device 31 is before the use start.

Figure 17:
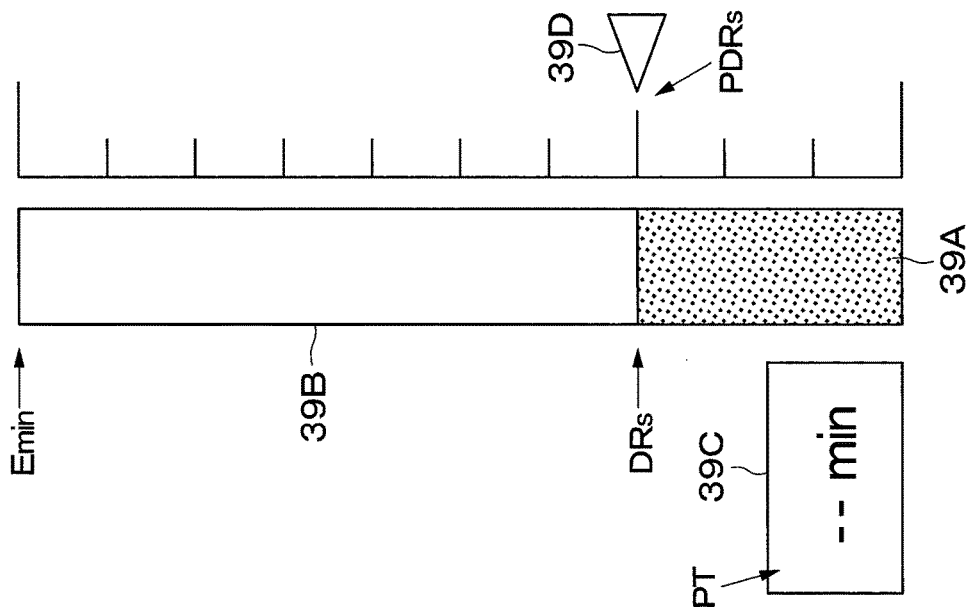
FIG. 17 is an explanatory diagram showing a state of the electricity storage device and a display content of the monitor device in a state before use start of the electricity storage device.

As shown in FIG. 17, the first conversion value Eb by the battery electricity storage rate SOC and the second conversion value Er by the current square integrating rate Risc both are 100%. That is, this is a state having the maximum allowance to the transferring from the normal mode NMODE to the low speed mode LSMODE. In addition, the maximum speed reduction rate DRs is not lowered based upon either one of the battery electricity storage rate SOC and the current square integrating rate Risc, and is 100%. Therefore, the battery discharge power from the electricity storage device 31 is not restricted, and the HCU 36 operates in the normal mode NMODE. As a result, the speed reduction degree displaying part 39A and the common scale displaying part 39B are displayed in a state where the bars thereof are expanded at the maximum.

In addition, since the electricity storage device 31 is not used, the time until the transferring to the low speed mode LSMODE is not calculated. That is, a first arrival predicting time PT1 by the battery electricity storage rate SOC and a second arrival predicting time PT2 by the current square integrating rate Risc both are not calculated. Therefore, the effect that the low speed mode arrival predicting time PT is not calculated and the transfer to the low speed mode LSMODE is not performed is displayed on the low speed mode arrival time displaying part 39C.

Further, since the transfer to the low speed mode LSMODE is not predicted, the first predicting maximum speed reduction rate PDRs1 by the battery electricity storage rate SOC and the second predicting maximum speed reduction rate PDRs2 by the current square integrating rate Risc both are 100%. Therefore, an indicator of the speed reduction degree predicting value displaying part 39D is arranged in a position of the maximum value (DRs=100%) in the bar of the speed reduction degree displaying part 39A.

Next, an explanation will be made of the display content in the monitor device 39 in a case where the battery electricity storage rate SOC is lowered in a range of the normal mode NMODE with reference to FIG. 18. At this time, the battery electricity storage rate SOC is 47.5%, and the current square integrating rate Risc is 30%.

Figure 18:
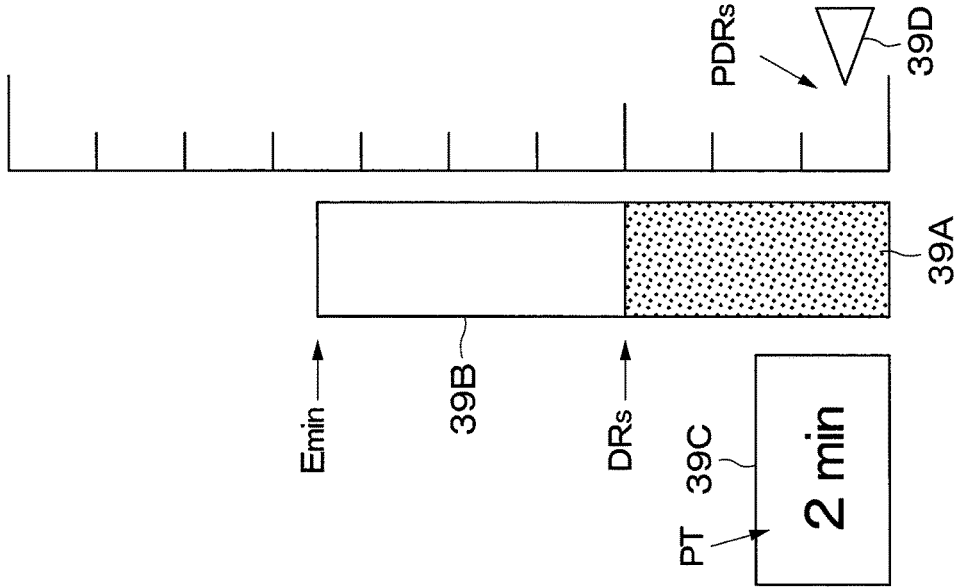
FIG. 18 is an explanatory diagram showing a state of the electricity storage device and a display content of the monitor device in a case where a battery electricity storage rate reduces in a range of a normal mode.

As shown in FIG. 18, the battery electricity storage rate SOC is an intermediate value of 35% to 60% as the appropriate use range in the normal mode NMODE. Therefore, the first conversion value Eb is 50%. On the other hand, the current square integrating rate Risc increases by 1/3 of 0% to 90% as the appropriate use range in the normal mode NMODE, and the allowance is lowered to 2/3. Therefore, the second conversion value Er is approximately 66.7%.

The maximum speed reduction rate DRs is not lowered based upon either one of the battery electricity storage rate SOC and the current square integrating rate Risc, and is 100%. Therefore, the battery discharge power from the electricity storage device 31 is not restricted, and the HCU 36 operates in the normal mode NMODE. As a result, the bar of the speed reduction degree displaying part 39A is displayed in the most expanded state. On the other hand, the bar of the common scale displaying part 39B is displayed in a state of being contracted to the half based upon the first conversion value Eb.

In addition, the electricity storage device 31 is in a use state. Therefore, the first arrival predicting time PT1 is calculated as, for example, two minutes based upon the battery electricity storage rate SOC. On the other hand, the second arrival predicting time PT2 is calculated as, for example, 10 minutes based upon the current square integrating rate Risc. At this time, the battery electricity storage rate SOC has less allowance than the current square integrating rate Risc. Therefore, the first arrival predicting time PT1 is shorter than the second arrival predicting time PT2. As a result, the low speed mode arrival predicting time PT (PT=two minutes) based upon the first arrival predicting time PT1 is displayed on the low speed mode arrival time displaying part 39C.

Further, the first predicting maximum speed reduction rate PDRs1 by the battery electricity storage rate SOC is predicted as 75%, and the second predicting maximum speed reduction rate PDRs2 by the current square integrating rate Risc is predicted as 80%. Therefore, a value of the first predicting maximum speed reduction rate PDRs1 is selected as the predicting maximum speed reduction rate PDRs, and an indicator of the speed reduction degree predicting value displaying part 39D is arranged in a position (a value of 75%) of the first predicting maximum speed reduction rate PDRs1 in the bar of the speed reduction degree displaying part 39A.

Next, an explanation will be made of the display content in the monitor device 39 in a case where the current square integrating rate Risc increases in a range of the normal mode NMODE with reference to FIG. 19. At this time, the battery electricity storage rate SOC is 55%, and the current square integrating rate Risc is 30%.

Figure 19:
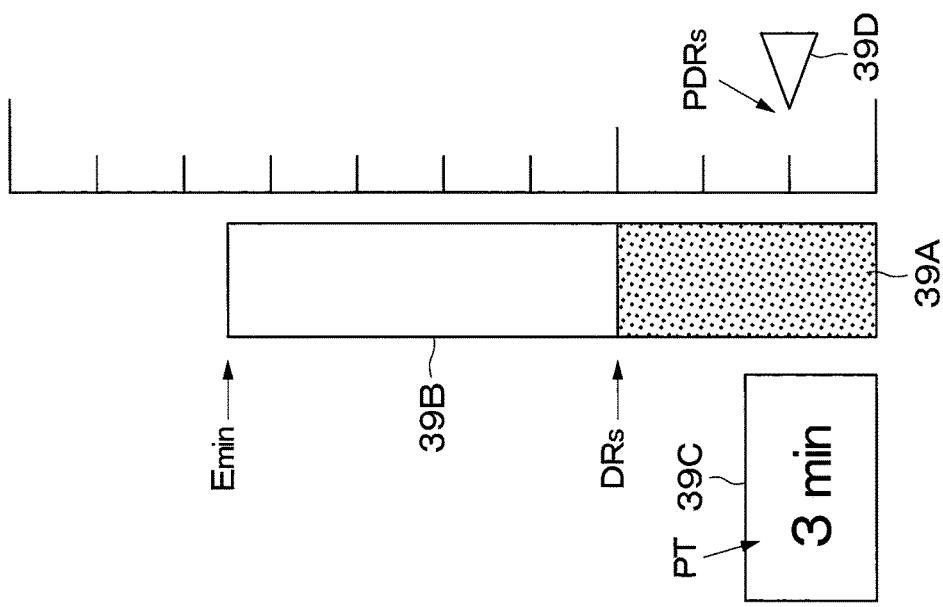
FIG. 19 is an explanatory diagram showing a state of the electricity storage device and a display content of the monitor device in a case where a current square integrating rate increases in a range of the normal mode.

As shown in FIG. 19, the battery electricity storage rate SOC is a value of 4/5 of 35% to 60% as the appropriate use range in the normal mode NMODE. Therefore, the first conversion value Eb is 80%. On the other hand, the current square integrating rate Risc increases by 1/3 of 0% to 90% as the appropriate use range in the normal mode NMODE, and the allowance is lowered to 2/3. Therefore, the second conversion value Er is approximately 66.7%.

The maximum speed reduction rate DRs is not lowered based upon either one of the battery electricity storage rate SOC and the current square integrating rate Risc, and is 100%. Therefore, the battery discharge power from the electricity storage device 31 is not restricted, and the HCU 36 operates in the normal mode NMODE. As a result, the bar of the speed reduction degree displaying part 39A is displayed in the most expanded state. On the other hand, the bar of the common scale displaying part 39B is displayed in a state of being contracted to 2/3 based upon the second conversion value Er.

In addition, the electricity storage device 31 is in a use state. Therefore, the first arrival predicting time PT1 is calculated as, for example, 10 minutes based upon the battery electricity storage rate SOC. On the other hand, the second arrival predicting time PT2 is calculated as, for example, three minutes based upon the current square integrating rate Risc. At this time, the current square integrating rate Risc has less allowance than the battery electricity storage rate SOC. Therefore, the second arrival predicting time PT2 is shorter than the first arrival predicting time PT1. As a result, the low speed mode arrival predicting time PT (PT=three minutes) based upon the second arrival predicting time PT2 is displayed on the low speed mode arrival time displaying part 39C.

Further, the first predicting maximum speed reduction rate PDRs1 by the battery electricity storage rate SOC is predicted as 90%, and the second predicting maximum speed reduction rate PDRs2 by the current square integrating rate Risc is predicted as 80%. Therefore, a value of the second predicting maximum speed reduction rate PDRs2 is selected as the predicting maximum speed reduction rate PDRs, and an indicator of the speed reduction degree predicting value displaying part 39D is arranged in a position (a value of 80%) of the second predicting maximum speed reduction rate PDRs2 in the bar of the speed reduction degree displaying part 39A.

Next, an explanation will be made of the display content in the monitor device 39 in a case where the battery electricity storage rate SOC reduces in a range of the low speed mode LSMODE with reference to FIG. 20. At this time, the battery electricity storage rate SOC is 32.5%, and the current square integrating rate Risc is 30%.

Figure 20:
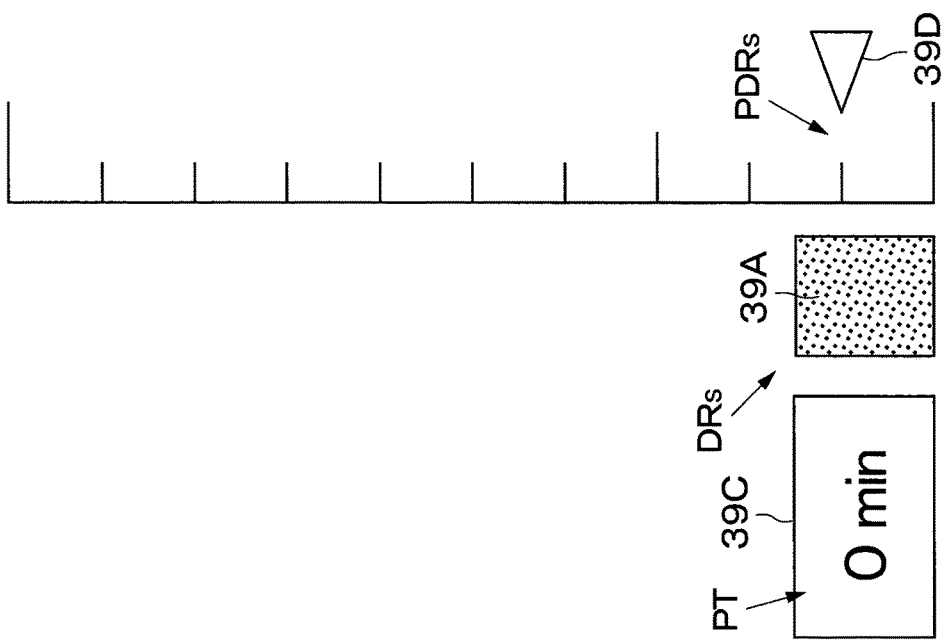
FIG. 20 is an explanatory diagram showing a state of the electricity storage device and a display content of the monitor device in a case where a battery electricity storage rate reduces in a range of a low speed mode.

As shown in FIG. 20, the battery electricity storage rate SOC is lower than 35% as the lower limit value (appropriate reference value SOC1) of the appropriate use range in the normal mode NMODE. Therefore, the first conversion value Eb is 0%. On the other hand, the current square integrating rate Risc increases by 1/3 to 0% to 90% as the appropriate use range in the normal mode NMODE, and the allowance is lowered to 2/3. Therefore, the second conversion value Er is approximately 66.7%.

In addition, the battery electricity storage rate SOC is an intermediate value of 30% to 35% as a range in the low speed mode LSMODE. Therefore, the maximum speed reduction rate DRs by the battery electricity storage rate SOC is 85% as an intermediate value of 70% to 100%. On the other hand, since the maximum speed reduction rate DRs is a value in a range of the normal mode NMODE, the maximum speed reduction rate DRs by the current square integrating rate Risc is 100%. Therefore, the battery discharge power from the electricity storage device 31 is restricted based upon the battery electricity storage rate SOC, and the HCU 36 operates in the low speed mode LSMODE. As a result, the bar of the speed reduction degree displaying part 39A is displayed in a state of being contracted to a position of 85% (a position of the half) based upon the maximum speed reduction rate DRs by the battery electricity storage rate SOC. On the other hand, since the mode is already transferred to the low speed mode LSMODE, the bar of the common scale displaying part 39B is not displayed.

In addition, the mode is already transferred to the low speed mode LSMODE based upon a reduction of the battery electricity storage rate SOC. Therefore, the first arrival predicting time PT1 is calculated as 0 minutes. On the other hand, the second arrival predicting time PT2 is not calculated since the mode does not transfer to the low speed mode LSMODE based upon the current square integrating rate Risc. As a result, the low speed mode arrival predicting time PT (PT=0 minutes) based upon the first arrival predicting time PT1 is displayed on the low speed mode arrival time displaying part 39C.

Further, the first predicting maximum speed reduction rate PDRs1 by the battery electricity storage rate SOC is predicted as 80%, and the second predicting maximum speed reduction rate PDRs2 by the current square integrating rate Risc is predicted as 100%. Therefore, a value of the first predicting maximum speed reduction rate PDRs1 is selected as the predicting maximum speed reduction rate PDRs, and an indicator of the speed reduction degree predicting value displaying part 39D is arranged in a position (a value of 80%) of the first predicting maximum speed reduction rate PDRs1 in the bar of the speed reduction degree displaying part 39A.

Next, an explanation will be made of the display content in the monitor device 39 in a case where the current square integrating rate Risc increases in a range of the low speed mode LSMODE with reference to FIG. 21. At this time, the battery electricity storage rate SOC is 55%, and the current square integrating rate Risc is 96.7%.

Figure 21:
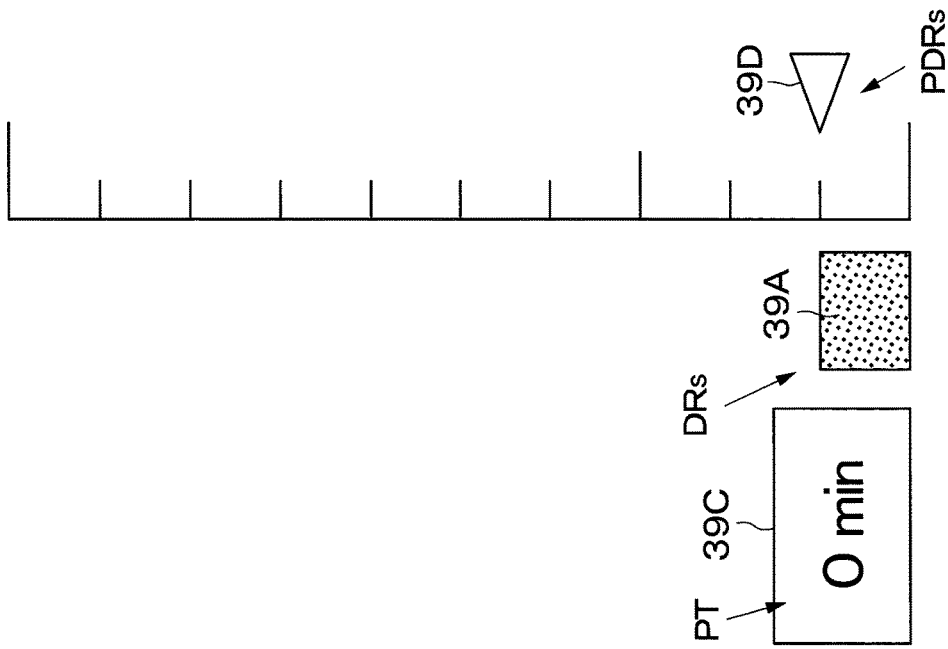
FIG. 21 is an explanatory diagram showing a state of the electricity storage device and a display content of the monitor device in a case where a current square integrating rate increases in a range of the low speed mode.

As shown in FIG. 21, the battery electricity storage rate SOC is a value of 4/5 of 35% to 60% as the appropriate use range in the normal mode NMODE. Therefore, the first conversion value Eb is 80%. On the other hand, the current square integrating rate Risc increases more than 90% as the upper limit value (appropriate reference value Risc1) of the appropriate use range in the normal mode NMODE. Therefore, the second conversion value Er is 0%.

In addition, the battery electricity storage rate SOC is a value in a range in the normal mode NMODE. Therefore, the maximum speed reduction rate DRs by the battery electricity storage rate SOC is 100%. On the other hand, the maximum speed reduction rate DRs is a value of 2/3 of 90% to 100% as a range of the low speed mode LSMODE. Therefore, the maximum speed reduction rate DRs by the current square integrating rate Risc is 80% as a value that has increased by 1/3 in a range (70% to 100%) in the low speed mode LSMODE, that is, as a value that has increased by 10% from the maximum speed reduction rate minimum value DRsmin. Therefore, the battery discharge power from the electricity storage device 31 is restricted based upon the current square integrating rate Risc, and the HCU 36 operates in the low speed mode LSMODE. As a result, the bar of the speed reduction degree displaying part 39A is displayed in a state of being contracted to a position of 80% based upon the maximum speed reduction rate DRs by the current square integrating rate Risc. On the other hand, since the mode is already transferred to the low speed mode LSMODE, the bar of the common scale displaying part 39B is not displayed.

In addition, since the mode does not transfer to the low speed mode LSMODE based upon the battery electricity storage rate SOC, the first arrival predicting time PT1 is not calculated. On the other hand, the mode is already transferred to the low speed mode LSMODE based upon an increase of the current square integrating rate Risc. Therefore, the second arrival predicting time PT2 is calculated as 0 minutes. As a result, the low speed mode arrival predicting time PT (PT=0 minutes) based upon the second arrival predicting time PT2 is displayed on the low speed mode arrival time displaying part 39C.

Further, the first predicting maximum speed reduction rate PDRs1 by the battery electricity storage rate SOC is predicted as 100%, and the second predicting maximum speed reduction rate PDRs2 by the current square integrating rate Risc is predicted as 80%. Therefore, a value of the second predicting maximum speed reduction rate PDRs2 is selected as the predicting maximum speed reduction rate PDRs, and an indicator of the speed reduction degree predicting value displaying part 39D is arranged in a position (a value of 80%) of the second predicting maximum speed reduction rate PDRs2 in the bar of the speed reduction degree displaying part 39A.

Thus, according to the present embodiment, the monitor device 39 is provided with the speed reduction degree displaying part 39A. Therefore, the maximum speed reduction rate DRs can be displayed as the speed reduction degree of the speed of the hydraulic actuator (the hydraulic motors 25, 26 and the cylinders 12D to 12F) on the speed reduction degree displaying part 39A. As a result, at the transferring to the low speed mode LSMODE, the speed reduction degree of the speed can be displayed on the monitor device 39. Accordingly, an operator makes visual contact with the monitor device 39, making it possible to easily understand whether or not the movement speed is lowered by the transferring to the low speed mode LSMODE and the degree of the speed reduction when the movement speed is lowered. That is, the operator makes visual contact with the monitor device 39, making it possible to instantly and intuitively understand the present situation of the hydraulic excavator 1. As a result, for example, the operator can be encouraged to make the determination of the continuation or cease of the work, to perform an efficient work in accordance with the state of the electricity storage device 31.

In addition, the HCU 36 is further provided with the common scale conversion minimum value calculating section 52 (the common scale representative value specifying section) that converts into a common scale a region of not transferring in the low speed mode LSMODE to each of a plurality of state-amounts (the battery electricity storage rate SOC and the current square integrating rate Risc) indicative of a state of the electricity storage device 31, and thereby, converts the present value of each of the plurality of state-amounts into a value of the common scale to specify any one of these values as a representative value. In addition thereto, the monitor device 39 is further provided with the common scale displaying part 39B that displays the common scale conversion minimum value Emin as the representative value. Therefore, an operator makes visual contact with the common scale displaying part 39B in the monitor device 39, thus making it possible to understand with how much allowance the present hydraulic excavator 1 operates to the low speed mode LSMODE to perform the work in accordance with the state of the present vehicle body.

The HCU 36 is further provided with the low speed mode arrival predicting time calculating section 53 (the low speed mode arrival time predicting section) that predicts the low speed mode arrival predicting time PT until arriving in the low speed mode LSMODE based upon a reducing speed or an increasing speed of each value of the plurality of state-amounts (the battery electricity storage rate SOC and the current square integrating rate Risc). In addition thereto, the monitor device 39 is further provided with the low speed mode arrival time displaying part 39C that displays the low speed mode arrival predicting time PT. As a result, an operator in visual contact with the low speed mode arrival time displaying part 39C in the monitor device 39, can understand the remaining time until arriving in the low speed mode LSMODE when the present work continues to be performed. Accordingly, for example, since the work stops before transferring to the low speed mode LSMODE to suppress the transfer to the low speed mode LSMODE, the stress due to a reduction in the movement speed can be reduced.

The HCU 36 is further provided with the predicting maximum speed reduction rate calculating section 54 (the speed reduction degree predicting value calculating section) that calculates the predicting maximum speed reduction rate PDRs as the predicting value of the speed reduction degree of the speed of the hydraulic actuator at the transferring to the low speed mode LSMODE when it is determined to transfer to the low speed mode LSMODE based upon the reducing speed or the increasing speed of each value of the plurality of state-amounts (the battery electricity storage rate SOC and the current square integrating rate Risc). In addition thereto, the monitor device 39 is further provided with the speed reduction degree predicting value displaying part 39D that displays the predicting maximum speed reduction rate PDRs. As a result, an operator in visual contact with the speed reduction degree predicting value displaying part 39D of the monitor device 39, can understand a magnitude of the present work load.

In addition, the plurality of state-amounts of the electricity storage device 31 to be input to the HCU 36 include the battery electricity storage rate SOC of the electricity storage device 31 and the current square integrating rate Risc (current square integrating value) of the electricity storage device 31. Therefore, the output command calculating section 40 (low speed mode executing section) of the HCU 36 executes the low speed mode LSMODE when the battery electricity storage rate SOC and the current square integrating rate Risc of the electricity storage device 31 surpass a given threshold, extending a lifetime of the electricity storage device 31.

The maximum output of the engine 21 is made smaller than the maximum power of the hydraulic pump 23. Therefore, in the normal mode NMODE, when the hydraulic pump 23 is driven by the maximum power, the powering operation of the motor-generator 27 can assist in the engine 21 to drive the hydraulic pump 23. In addition, in the low speed mode LSMODE, for example, the output by the powering operation of the motor-generator 27 is reduced, making it possible to drive the hydraulic pump 23. Further, since the maximum output of the engine 21 is made smaller than the maximum power of the hydraulic pump 23, it is possible to use the engine 21 that is small-sized and can reduce a fuel consumption.

It should be noted that FIG. 15 to FIG. 21 show as an example a case where the maximum speed reduction rate DRs, the common scale conversion minimum value Emin, the low speed mode arrival predicting time PT and the predicting maximum speed reduction rate PDRs which are calculated by the HCU 36 are displayed on the monitor device 39 by the expansion/contraction of the bar, the position of the indicator or the like. However, the present invention is not limited to this embodiment, but may be changed as needed in the scope not departing from the subject of the present invention.

The above embodiment explains as an example a case where the current square integrating value or the current square integrating rate Risc is used as the charge/discharge intensity index of the electricity storage device 31, but the charge/discharge intensity index is not limited thereto. When the finding of the threshold for accelerating the degradation of the electricity storage device is only acquired, any factor for being able to relatively compare a magnitude of the charge/discharge amount may be used as the charge/discharge intensity index. Therefore, for example, a current effective value or an electric power effective value of a past constant time may be used for the charge/discharge intensity index.

In the above embodiment, the HCU 36 is provided with two kinds of modes composed of the normal mode NMODE and the low speed mode LSMODE. However, the present invention is not limited thereto, but, for example, by adding a heavy load mode in which the battery discharge power limit value Plim0 of the electricity storage device 31 is temporarily released in response to heavy loads to the normal mode NMODE and the low speed mode LSMODE, the HCU 36 may be configured to be provided with three kinds of modes or four kinds or more of modes.

In the above embodiment, the HCU 36 is configured to transfer from the normal mode NMODE to the low speed mode LSMODE based upon the battery electricity storage rate SOC and the current square integrating rate Risc. However, the present invention is not limited thereto, but the HCU 36 may be configured to transfer from the normal mode NMODE to the low speed mode LSMODE in response to the cell temperature of the electricity storage device 31, the temperature of the motor-generator 27, the temperature of the revolving electric motor 33 and the like. Further, the mode transfer may be manually switched by the mode selection switch or the like other than the automatic transfer by the HCU 36.

In the above embodiment, the maximum output of the engine 21 is made smaller than the maximum power of the hydraulic pump 23, but the maximum output of the engine 21 is optionally set in accordance with a specification of the hydraulic excavator 1 or the like. Therefore, the maximum output of the engine 21 may be approximately the same as the maximum power of the hydraulic pump 23, or may be smaller than the maximum power of the hydraulic pump 23.

In the above embodiment, an example of using the lithium ion battery in the electricity storage device 31 is explained, but a secondary battery (for example, a nickel cadmium battery or nickel hydrogen battery) or a capacitor that can supply required electric power may be adopted. In addition, a step-up and -down device such as a DC-DC converter may be provided between the electricity storage device and the DC bus.

In the above embodiment, an example of using the hybrid hydraulic excavator 1 of a crawler type as the hybrid construction machine is explained. However, the present invention is not limited thereto, but the present invention may be applied to a hybrid construction machine that is only provided with a motor-generator jointed to an engine and a hydraulic pump, and an electricity storage device, and may be applied to various types of construction machines such as a wheel type hybrid hydraulic excavator, a hybrid wheel loader or a hybrid lift truck.

DESCRIPTION OF REFERENCE NUMERALS

1: Hybrid-type hydraulic excavator (Hybrid construction machine)
2: Lower traveling structure
4: Upper revolving structure
12: Working mechanism
12D: Boom cylinder (Hydraulic actuator)
12E: Arm cylinder (Hydraulic actuator)
12F: Bucket cylinder (Hydraulic actuator)
21: Engine
23: Hydraulic pump
25: Traveling hydraulic motor (Hydraulic actuator)
26: Revolving hydraulic motor (Hydraulic actuator)
27: Motor-generator
31: Electricity storage device
32: Battery control unit (Electricity storage device state detecting section)
33: Revolving electric motor
36: Hybrid control unit (Controller)
39: Monitor device
39A: Speed reduction degree displaying part
39B: Common scale displaying part
39C: Low speed mode arrival time displaying part
39D: Speed reduction degree predicting value displaying part
40: Output command calculating section (Low speed mode executing section)
50: Monitor display amount calculating section
51: Maximum speed reduction rate calculating section (Speed reduction degree calculating section)
52: Common scale conversion minimum value calculating section (Common scale representative value specifying section)
53: Low speed mode arrival predicting time calculating section (Low speed mode arrival time predicting section)
54: Predicting maximum speed reduction rate calculating section (Speed reduction degree predicting value calculating section)

The invention claimed is:

1. A hybrid construction machine comprising:
an engine;
a motor-generator that is connected mechanically to said engine;
an electricity storage device that is connected electrically to said motor-generator;
a hydraulic pump that is driven by torque of said engine and/or said motor-generator;
a plurality of hydraulic actuators that are driven by pressurized oil from said hydraulic pump;
a controller that controls output of said electricity storage device; and
a monitor device that is connected to said controller, wherein said controller:
detects a plurality of state-amounts indicative of a state of said electricity storage device, and, when any one of the plurality of state-amounts detected surpasses a given threshold, executes a low speed mode for reducing a movement speed of said hydraulic actuator in accordance with the surpassing degree,
calculates a speed reduction degree of a speed of said hydraulic actuator in said low speed mode, and
converts into a common scale a region of not transferring in said low speed mode to each of said plurality of state-amounts indicative of the state of said electricity storage device, and thereby converts the present value of each of said plurality of state-amounts into a value of said common scale to specify any one of these values as a representative value, and wherein said monitor device:
displays the speed reduction degree of the speed of said hydraulic actuator, and
displays said representative value.

2. The hybrid construction machine according to claim 1, wherein
said controller predicts a low speed mode arrival time until arriving in said low speed mode based upon a reducing speed or an increasing speed of each value of said plurality of state-amounts, and
said monitor device displays said low speed mode arrival time.

3. The hybrid construction machine according to claim 1, wherein
said controller calculates a predicting value of a speed reduction degree of a speed of said hydraulic actuator at the transferring to said low speed mode when it is determined to transfer to said low speed mode based upon a reducing speed or an increasing speed of each value of said plurality of state-amounts, and
said monitor device displays the predicting value of the speed reduction degree of the speed of said hydraulic actuator.

* * * * *